US012757001B2

(12) United States Patent
Hwang et al.

(10) Patent No.: US 12,757,001 B2
(45) Date of Patent: Oct. 6, 2026

(54) METHOD FOR TRANSMITTING MESSAGE BY V2X UE IN WIRELESS COMMUNICATION SYSTEM AND DEVICE THEREFOR

(71) Applicant: LG ELECTRONICS INC., Seoul (KR)

(72) Inventors: Jaeho Hwang, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 517 days.

(21) Appl. No.: 18/272,318

(22) PCT Filed: Jan. 14, 2022

(86) PCT No.: PCT/KR2022/000759

§ 371 (c)(1),
(2) Date: Jul. 13, 2023

(87) PCT Pub. No.: WO2022/154590

PCT Pub. Date: Jul. 21, 2022

(65) Prior Publication Data

US 2025/0016537 A1 Jan. 9, 2025

(30) Foreign Application Priority Data

Jan. 14, 2021 (KR) ........................ 10-2021-0005372

(51) Int. Cl.
*H04W 4/00* (2018.01)
*H04W 4/90* (2018.01)
(Continued)

(52) U.S. Cl.
CPC ................ *H04W 4/90* (2018.02); *H04W 4/40* (2018.02); *H04W 92/18* (2013.01)

(58) Field of Classification Search
CPC ......... H04W 4/90; H04W 4/40; H04W 92/18; H04W 4/027; H04W 52/028
See application file for complete search history.

(56) References Cited

U.S. PATENT DOCUMENTS

2019/0235499 A1* 8/2019 Kazemi ................. G01S 17/931
2021/0018323 A1* 1/2021 Freedman .......... G01C 21/3461
2022/0030408 A1* 1/2022 Zhang ..................... H04W 4/90

FOREIGN PATENT DOCUMENTS

WO 2017136627 A1 8/2017
WO 2018220637 A1 12/2018

* cited by examiner

*Primary Examiner* — Omoniyi Obayanju
(74) *Attorney, Agent, or Firm* — BRYAN CAVE LEIGHTON PAISNER LLP

(57) ABSTRACT

Disclosed are a method for transmitting a message by a first vehicle-to-everything user equipment (V2X UE) in a wireless communication system according to various embodiments, and a device therefor. Disclosed are a method and a device therefor, the method comprising the steps of: obtaining status information related to the first V2X UE; and transmitting the message on the basis of the status information, wherein the status information includes mobility information of the first V2X UE, variation information, internal status information of the first V2X, and station type information, and the first V2X UE quantifies the mobility information as a first risk level, the variation information as a second risk level, and the internal status information as a third risk level, wherein each of the first severity level, second severity level, and third severity level is applied with a weight determined based on the station type information.

11 Claims, 28 Drawing Sheets

(51) Int. Cl.

| | |
|---|---|
| *H04W 4/40* | (2018.01) |
| *H04W 92/18* | (2009.01) |

(a)

(b)

(a)

(b)

| ANS.1 Representation | |
|---|---|
| DF_ExtraStatus | ::= SEQUENCE { |
| SeverityLevel | INTEGER, -- 0~10 |
| ExposureLevel | INTEGER, -- 0~10 |
| ControllabilityLevel | INTEGER, -- 0~10 |
| Gps Status | INTEGER, -- 0:Unknown, 1:IMU, 2:GPS, 3:DGPS, 4:RTK |
| Lcd Status | INTEGER, -- 0:Unknown, 1:LCD off, 2: LCD on |
| } | |

METHOD FOR TRANSMITTING MESSAGE BY V2X UE IN WIRELESS COMMUNICATION SYSTEM AND DEVICE THEREFOR

This application is the National Stage filing under 35 U.S.C. 371 of International Application No. PCT/KR2022/000759, filed Jan. 14, 2022, which claims priority to Korean Patent Application No. 10-2021-0005372, filed Jan. 14, 2021, the contents of which are hereby incorporated by reference herein in their entirety.

TECHNICAL FIELD

The present disclosure relates to a method for transmitting a message by a first vehicle to everything (V2X) terminal in a wireless communication system supporting a sidelink, and a device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

An object of the present disclosure is to provide a method and device for minimizing the battery consumption of a vehicle-to-everything user equipment (V2X UE) by quantifying the status information related to a first V2X UE into a plurality of severity levels and determining a message transmission scheme and an operation method for the first V2X UE based on the plurality of severity levels.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

In one aspect of the present disclosure, provided herein is a method for transmitting a message by a first vehicle-to-everything user equipment (V2X UE) in a wireless communication system. The method may include obtaining status information related to the first V2X UE, and transmitting the message based on the status information. The status information may include mobility information about the first V2X UE, change amount information, internal status information about the first V2X UE, and station type information. The first V2X UE may quantify the mobility information into a first severity level, may quantify the change amount information into a second severity level, and may quantify the internal status information into a third severity level. Each of the first severity level, second severity level, and third severity level is applied with a weight determined based on the station type information.

Alternatively, the first V2X UE may determine one transmission mode among a plurality of preconfigured transmission modes based on the first severity level, and the message may be transmitted based on transmission and reception intervals and transmission power set according to the one transmission mode.

Alternatively, based on the second severity level being higher than or equal to a preset threshold level, the one transmission mode may be switched to an event mode. Based on the one transmission mode being switched to the event mode, the message may be transmitted immediately, regardless of the transmission and reception intervals.

Alternatively, the first V2X UE may determine a positioning mode based on a fourth severity level calculated based on a weighted sum of the first severity level, said second severity level, and said third severity level. A position of the first V2X UE may be measured based on at least one positioning method configured for the determined positioning mode.

Alternatively, the at least one positioning method may be at least one of a power saving mode method, an inertial measurement unit (IMU) based positioning method, a global positioning system (GPS) based positioning method, a differential global positioning system (DGPS) based positioning method, a real time kinematic (RTK) based positioning method, or a positioning method using wireless communication.

Alternatively, based on the second severity level being higher than or equal to a preset threshold level, the first V2X UE may switch to a positioning mode in which a positioning method capable of most precise positioning is configured.

Alternatively, the first V2X UE may determine an internal operation mode for the first V2X UE based on a fourth severity level calculated based on a weighted sum of the first severity level, the second severity level, and the third severity level. The internal operation mode may have parameters preconfigured to control at least one of a sleep timing of an application included in the first V2X UE, a display included in the first V2X UE, or a human machine interface (HMI) included in the first V2X UE.

Alternatively, the mobility information may include information about a position and speed of the first V2X UE, and the change amount information may include information about an amount of change in heading direction and acceleration of the first V2X UE.

Alternatively, the internal status information may include the number of applications running on the first V2X UE, types of the applications, a battery status, a connection status of an external output device, an operation status of a display, and information about whether a user of the first V2X UE is viewing the display.

Alternatively, the message may contain information about the first severity level, the second severity level, and the third severity level.

Alternatively, the first V2X UE may transmit the message containing information about the first severity level, the second severity level, and the third severity level to inform nearby V2X UEs of a severe situation of the first V2X UE.

In another aspect of the present disclosure, provided herein is a method for receiving a message by a second vehicle-to-everything user equipment (V2X UE) in a wireless communication system. The method may include receiving a message from a first V2X UE, and obtaining status information about the first V2X UE based on the message. The status information about the first V2X UE may include a first severity level obtained by quantifying mobility information about the first V2X UE, a second severity level obtained by quantifying mobility change amount information about the first V2X UE, and a third severity level obtained by quantifying internal status information about the first V2X UE. Each of the first severity level. second severity level, and third severity level is applied with a weight determined based on the station type information.

In another aspect of the present disclosure, provided herein is a first vehicle to everything (V2X) terminal for transmitting a message in a wireless communication system. The first V2X UE may include a radio frequency (RF) transceiver, and a processor coupled to the RF transceiver. The processor may be configured to obtain status information related to the first V2X UE, quantify mobility information included in the status information into a first severity level, change amount information included in the status information into a second severity level, and internal status information about the first V2X UE included in the status information into a third severity level, and transmit the message based on the status information. Each of the first severity level, second severity level, and third severity level is applied with a weight determined based on the station type information.

In another aspect of the present disclosure, provided herein is a second vehicle-to-everything user equipment (V2X UE) for receiving a message in a wireless communication system. The second V2X UE may include a radio frequency (RF) transceiver, and a processor coupled to the RF transceiver. The processor may control the RF transceiver to receive a message from the first V2X UE, and obtain status information about the first V2X UE based on the message. The status information about the first V2X UE may include a first severity level obtained by quantifying mobility information about the first V2X UE, a second severity level obtained by quantifying mobility change amount information about the first V2X UE, and a third severity level obtained by quantifying internal status information about the first V2X UE. Each of the first severity level, second severity level, and third severity level is applied with a weight determined based on the station type information.

In another aspect of the present disclosure, provided herein is a chipset for transmitting a message in a wireless communication system. The chipset may include at least one processor, and at least one memory operatively coupled to the at least one processor and, when executed, causing the at least one processor to perform operations. The operations may include obtaining status information related to the first vehicle-to-everything user equipment (V2X UE), quantifying mobility information included in the status information into a first severity level, change amount information included in the status information into a second severity level, and internal status information about the first V2X UE included in the status information into a third severity level, and transmitting the message based on the status information. Each of the first severity level, second severity level, and third severity level is applied with a weight determined based on the station type information.

In another aspect of the present disclosure, provided herein is a computer-readable storage medium including at least one computer program for performing an operation of transmitting a message in a wireless communication system. The storage medium may include at least one computer program causing at least one processor to perform the operation of transmitting the message, and a computer-readable storage medium having the at least one computer program stored thereon. The operation may include obtaining status information related to the first vehicle-to-everything user equipment (V2X UE), quantifying mobility information included in the status information into a first severity level, change amount information included in the status information into a second severity level, and internal status information about the first V2X UE included in the status information into a third severity level, and transmitting the message based on the status information. Each of the first severity level, second severity level, and third severity level is applied with a weight determined based on the station type information.

According to various embodiments, status information related to a first V2X UE may be quantified into a plurality of severity levels, and a method of transmitting messages and a method of operating the first V2X UE may be determined based on the plurality of severity levels. Thereby, the consumption of the battery power of the first V2X UE may be minimized.

Alternatively, according to a first severity level into which information about the movement speed and location is quantified, the period of transmission and reception of the message may be extended in a situation where the severity of the user of the first V2X UE is low to minimize the battery power consumption of the first V2X UE. In a situation where the severity of the user of the first V2X UE is high, the period of transmission and reception may be shortened to ensure the safety of the user of the first V2X UE as much as possible.

Alternatively, when an emergency situation is detected in the user of the first V2X UE according to a second severity level into which the information on the change of the heading angle and the acceleration is quantified, a message type to inform the user of the emergency situation may be determined, and a message of the message type may be transmitted immediately to ensure the safety of the user as much as possible.

Alternatively, a third severity level, quantified based on the internal status information related to the first V2X UE and the status information related to the user of the first V2X UE, may be used to optimize the transmission scheme for the message or the operation method of the device according to whether the user can cope with the severe situation.

Alternatively, based on the first severity level, the second severity level, and the third severity level, a method of positioning the first V2X UE and a method of operating the display may be determined. Thereby, the V2X UE may be effectively operated according to the situation of the user.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

FIGS. 20 and 21 are diagrams illustrating a method for determining a transmission mode of a message based on a severity level, an exposure level, and the like.

DETAILED DESCRIPTION

Figure 1:
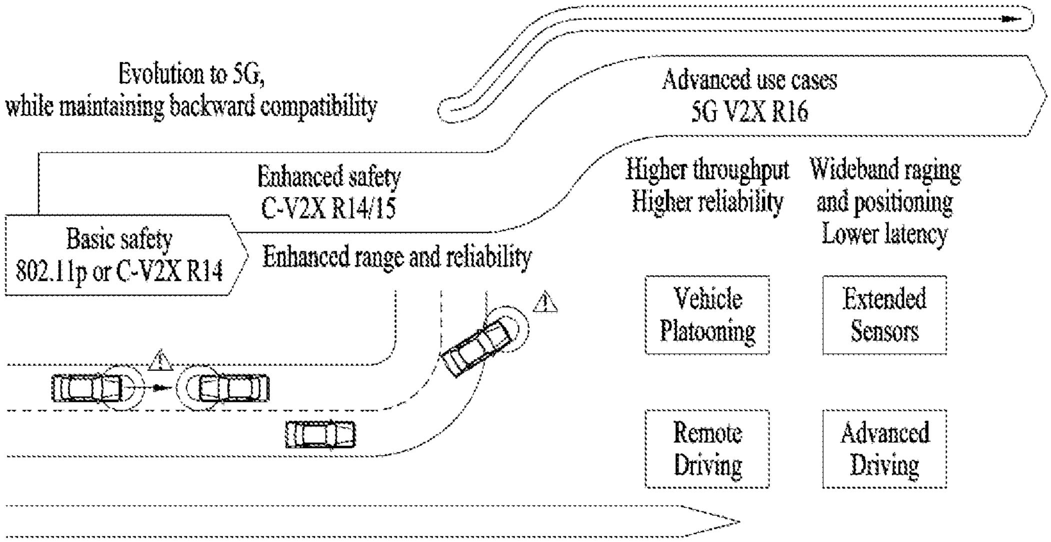
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
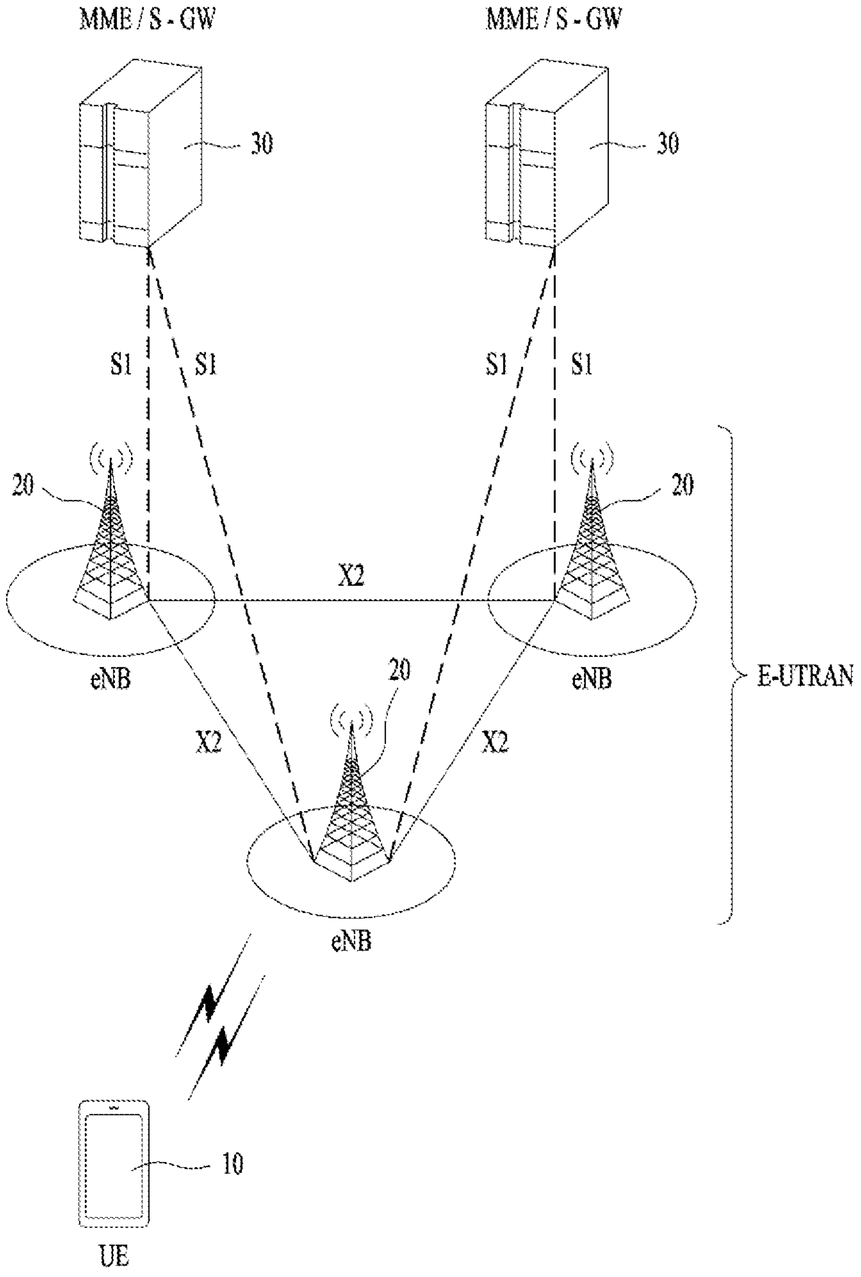
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
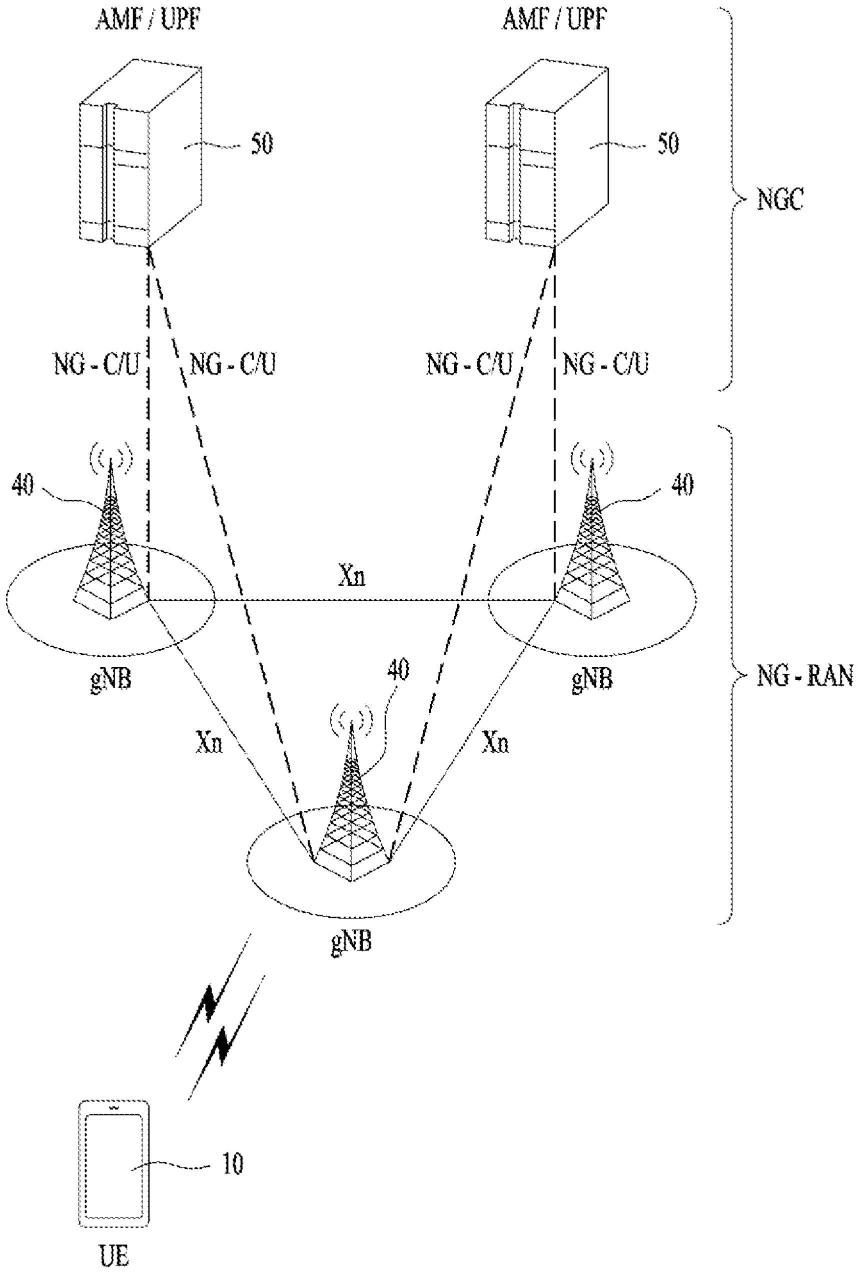
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
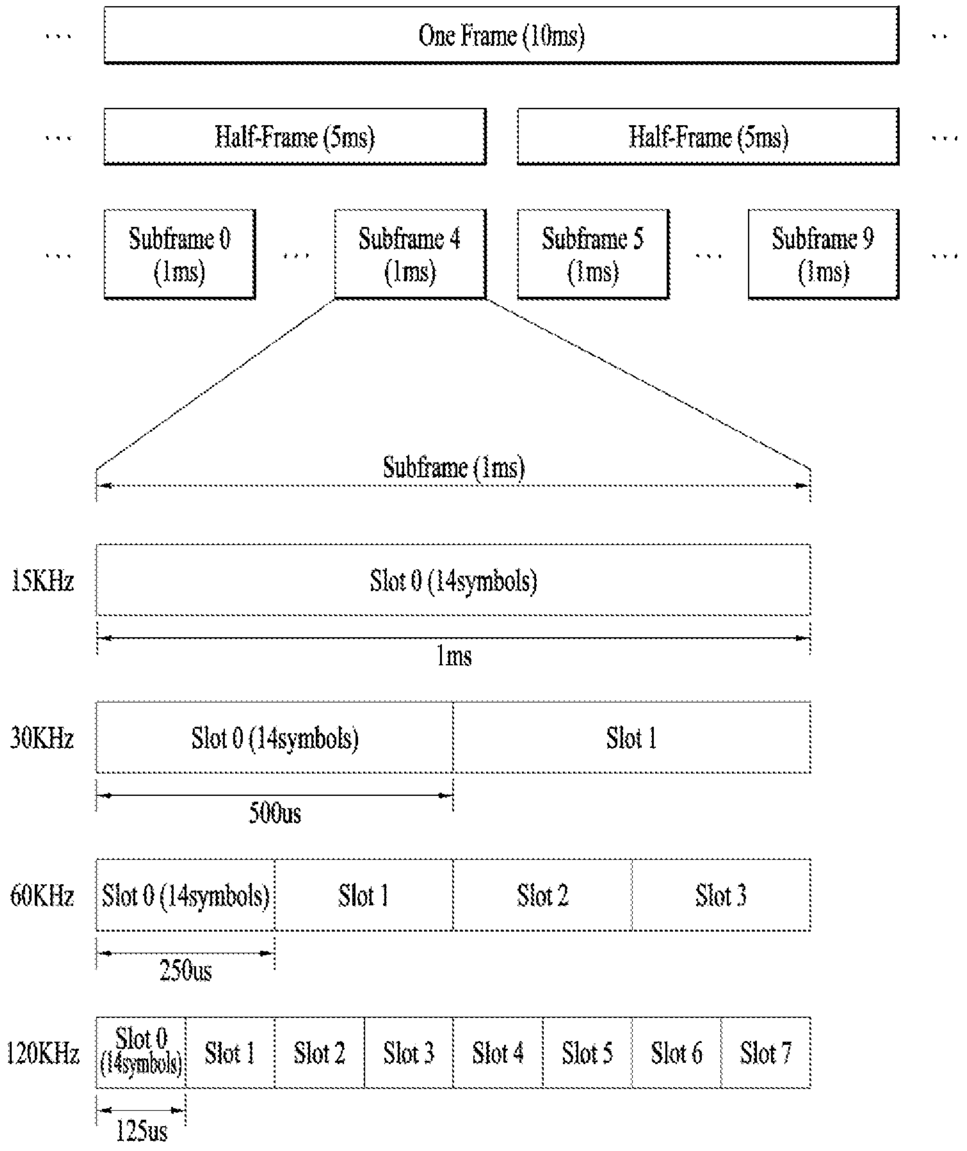
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 KHz/60 kHz. When the SCS is 60 KHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
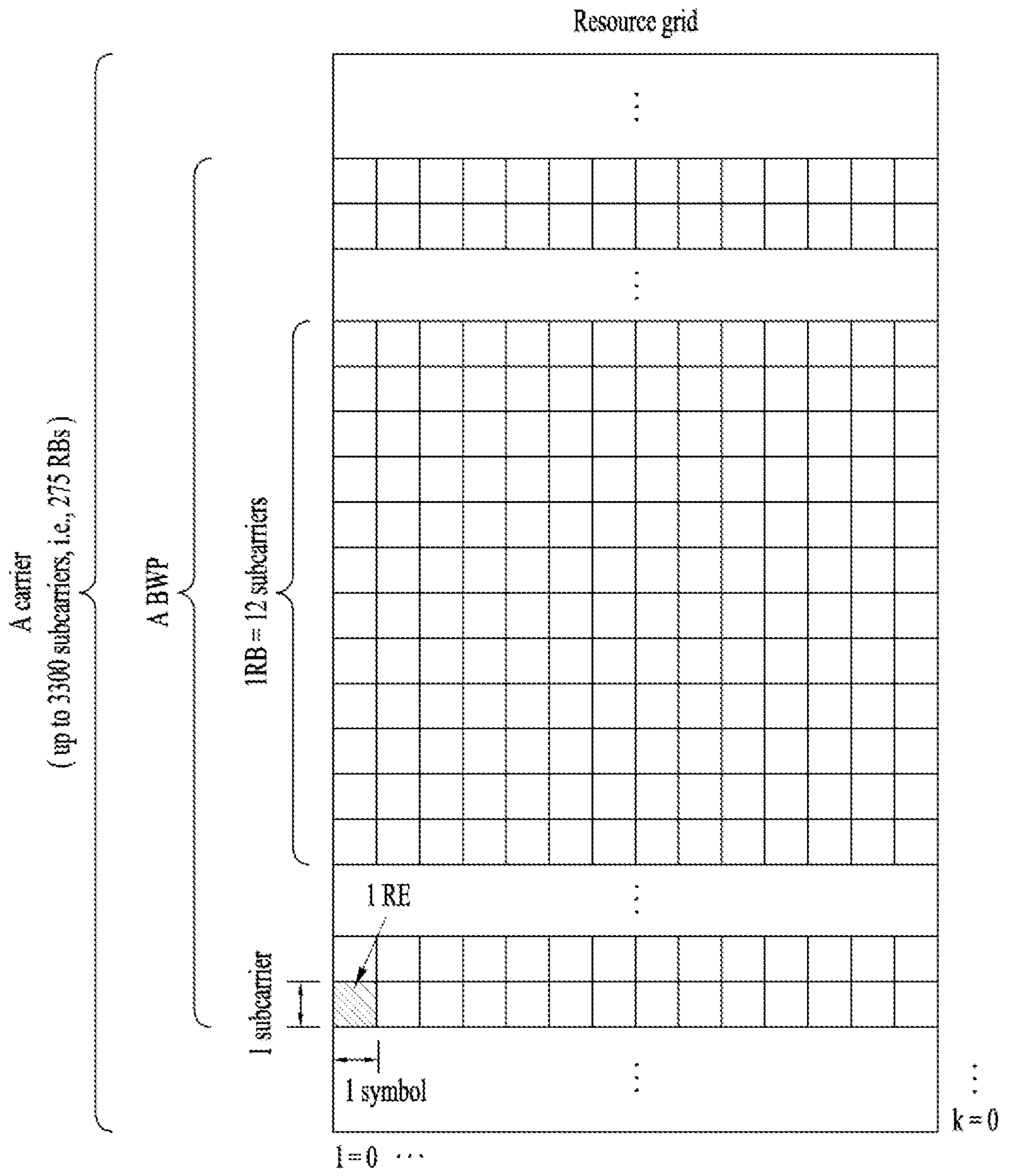
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
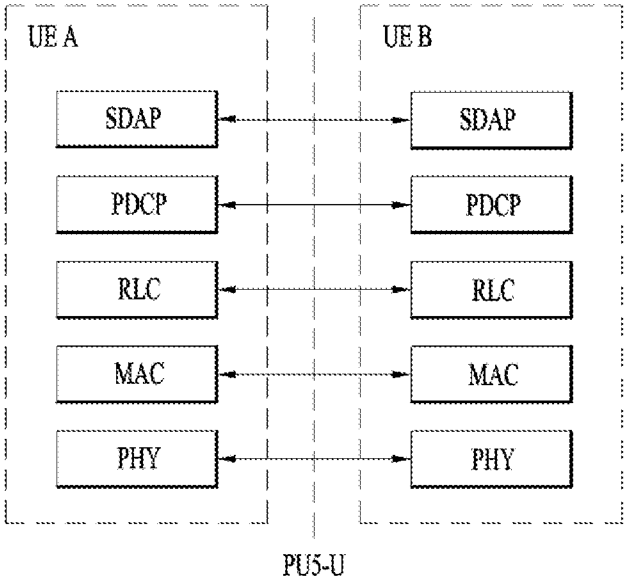
FIG. 6 illustrates a radio protocol architecture for SL communication.
Figure 6:
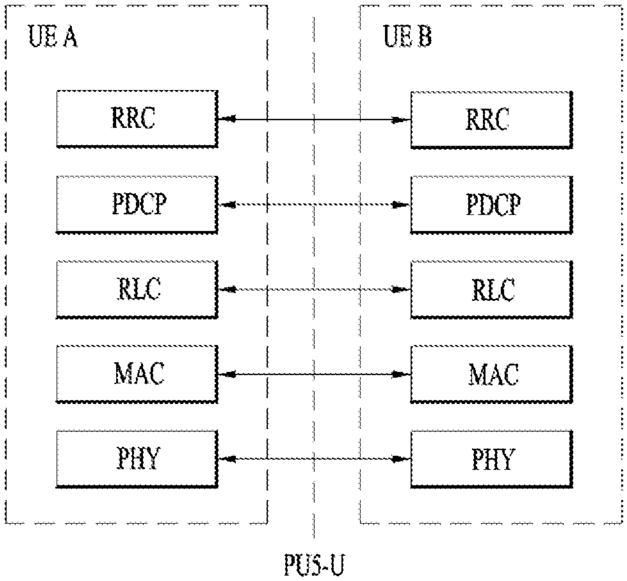

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre) set sidelink BWP (SL BWP). For example, the bandwidth of the S-SSB may be 11 resource blocks (RBs). For example, the PSBCH may span 11 RBs. The frequency position of the S-SSB may be (pre) set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 KHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 KHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
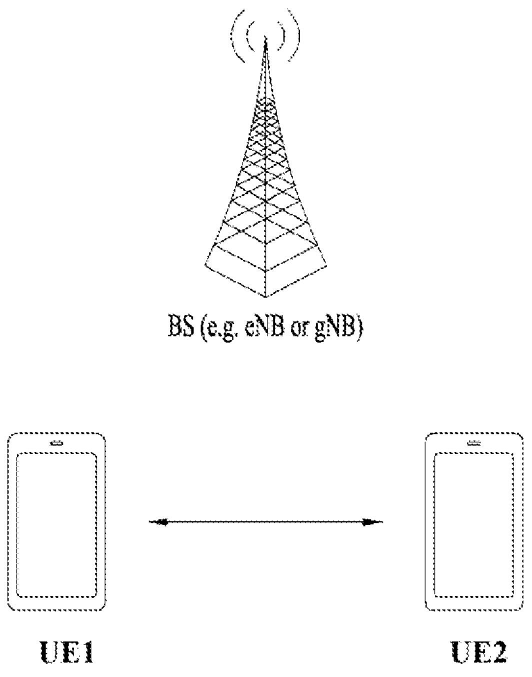
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
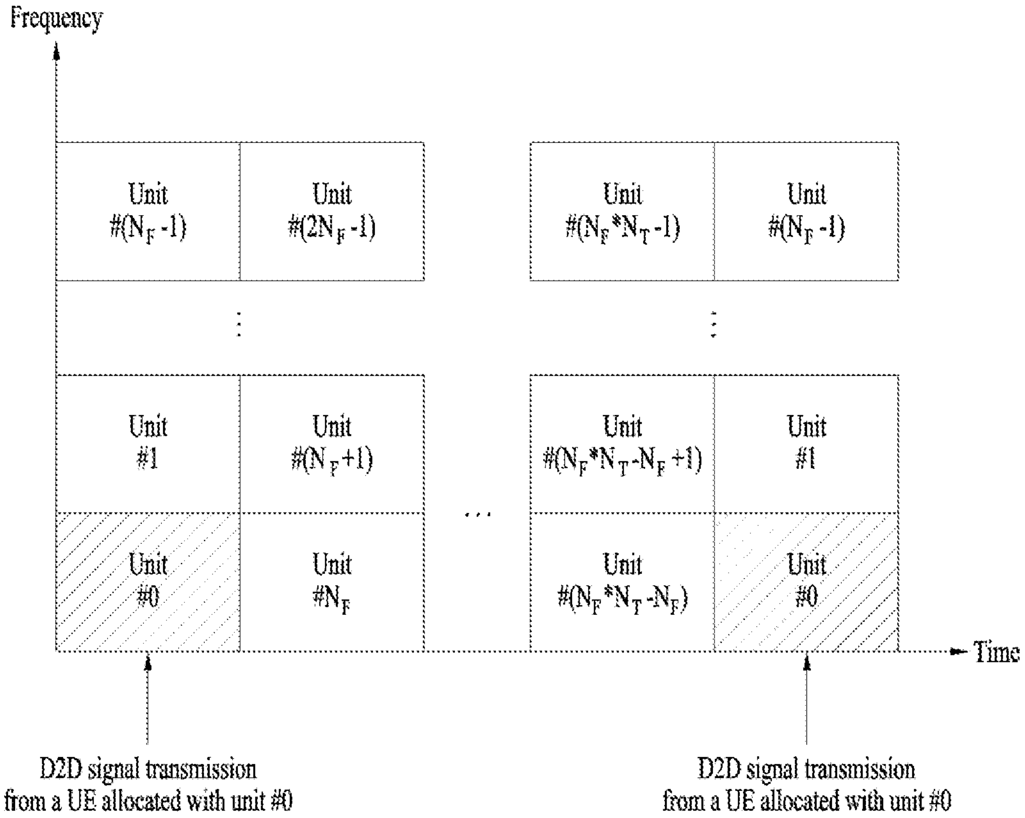
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 9:
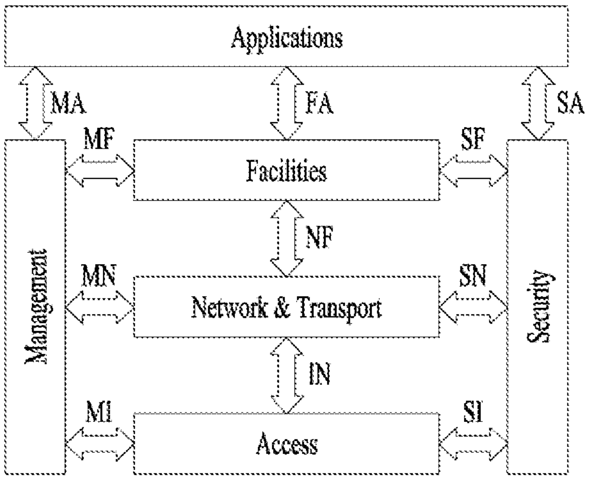
FIG. 9 is a diagram for explaining an ITS station reference architecture.

FIG. 9 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated in FIG. 9. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

Figure 10:
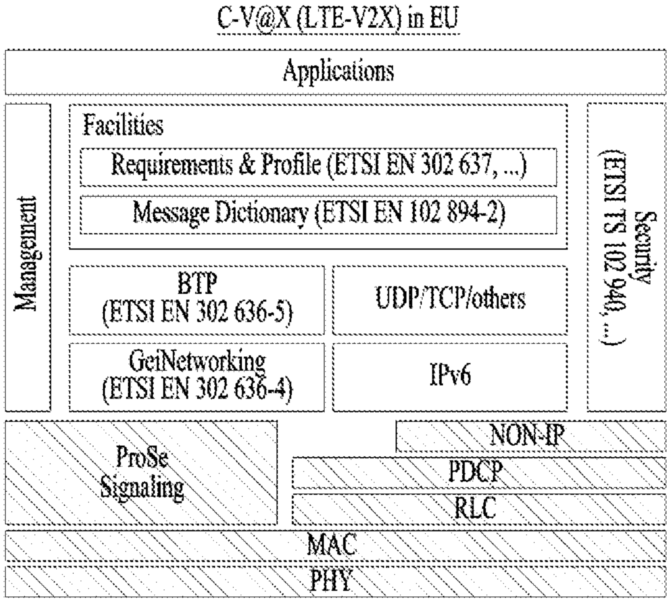
FIG. 10 illustrates an exemplary structure of an ITS station that may be designed and applied based on a reference architecture.
Figure 10:
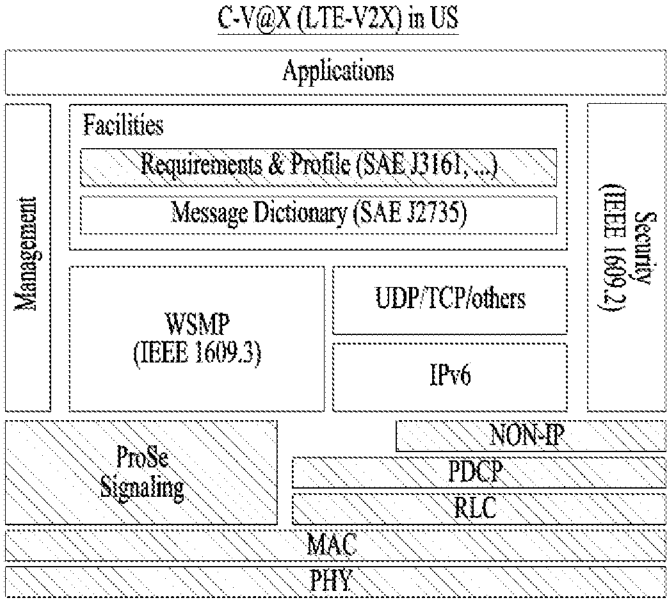

FIG. 10 illustrates an exemplary structure of an ITS station that may be designed and applied based on a reference architecture.

A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g. MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

Figure 11:
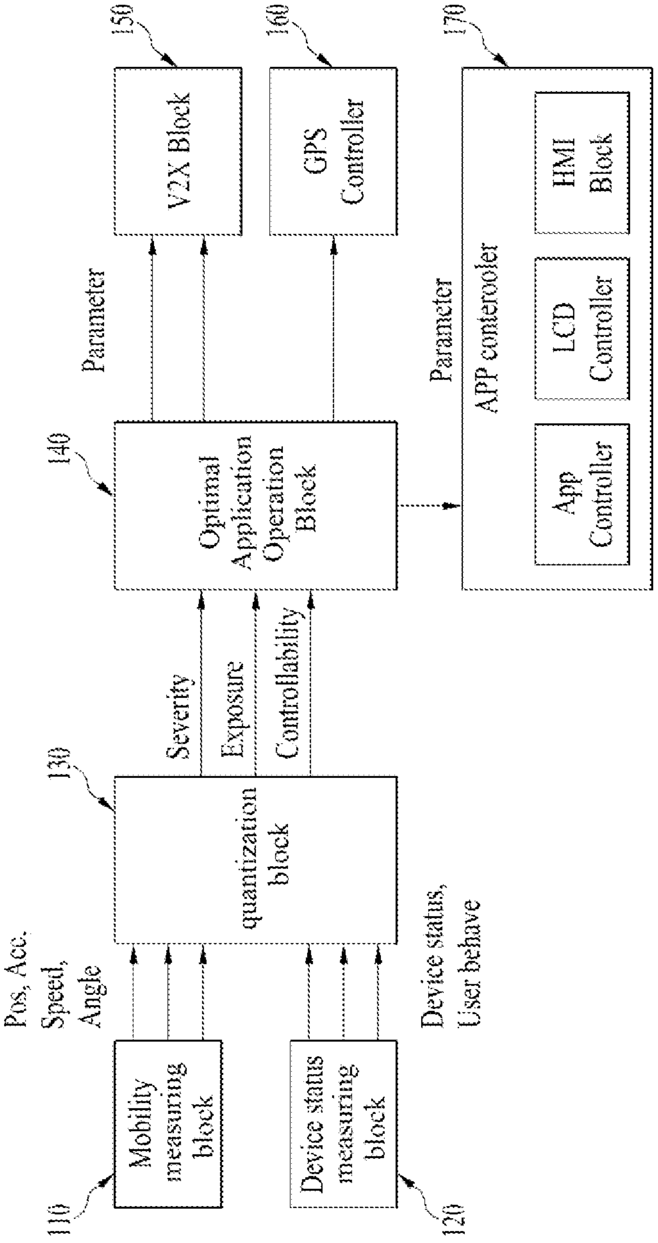
FIG. 11 is a block diagram illustrating a V2X UE based on an internal information quantification block.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path, and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below:

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

A SoftV2X system may be a system in which a SoftV2X server receives a VRU message or a personal safety message (PSM) from a vulnerable road user (VRU) or a V2X vehicle and transfers information on a neighbor VRU or vehicle based on the VRU message or the PSM message or may analyze a road condition, etc. on which neighbor VRUs or vehicles move and may transmit a message informing a neighbor VRU or vehicle of a collision warning, etc. based on the analyzed information (e.g., through a downlink signal) via V2X communication using a UU interface. Here, the VRU message may be a message transmitted to the SoftV2X server through the UU interface, and may include mobility information about the VRU, such as a position, a movement direction, a movement path, and a speed of the VRU. That is, the SoftV2X system may use a method of receiving mobility information of VRUs and/or vehicles related to V2X communication through the UU interface and controlling a driving route or a VRU movement flow of the VRU, etc. based on the mobility information received by the softV2X server, such as a network. The SoftV2X system may be configured in relation to V2N communication.

User equipment or pedestrian equipment (VRU device) that is difficult to perform direct communication (PC5, DSRC) related to V2X communication can provide or receive driving information and mobility information to nearby vehicles or VRUs through the SoftV2X system based on the UU interface. Through this, the user equipment or pedestrian equipment (VRU device) that is difficult to perform the direct communication (PC5, DSRC) can be protected from surrounding vehicles.

Internal Information Quantification Technique and Efficient SoftV2X Operation Technique In the conventional V2X technology, messages are configured and operated based on broadcast-based short-range communication devices such as DSRC (or CV2X). In the conventional V2X technology, a vehicle may periodically broadcast a message to nearby vehicles or devices without a link, regardless of the status of the vehicle. In this case, the vehicle transmits the message about its own status as much as possible in case the devices in the vicinity do not know when to receive the message. Furthermore, methods have been contemplated in which the maximum application of V2X is installed in an OBU device mounted on the vehicle, such that the message is transmitted without consideration of battery consumption.

However, there may be many V2X UEs that perform the operation of the Uu interface based on a battery (battery as the main power source). In this regard, there is a need for a new device for transmitting a message capable of notifying the surrounding of the status while minimizing the power consumption of the battery, and/or a modification of a conventional message operation method. Hereinafter, an optimized situational awareness device for the V2X UE and a method for operating an optimized message through the situational awareness device will be described in detail.

In addition, the following description is based on a V2X UE for ease of explanation. However, it is applicable to any device that performs short-range communication, such as a VRU (Vulnerable Road User) device or a DSRC device, and is not limited to the V2X UE.

Figure 12:
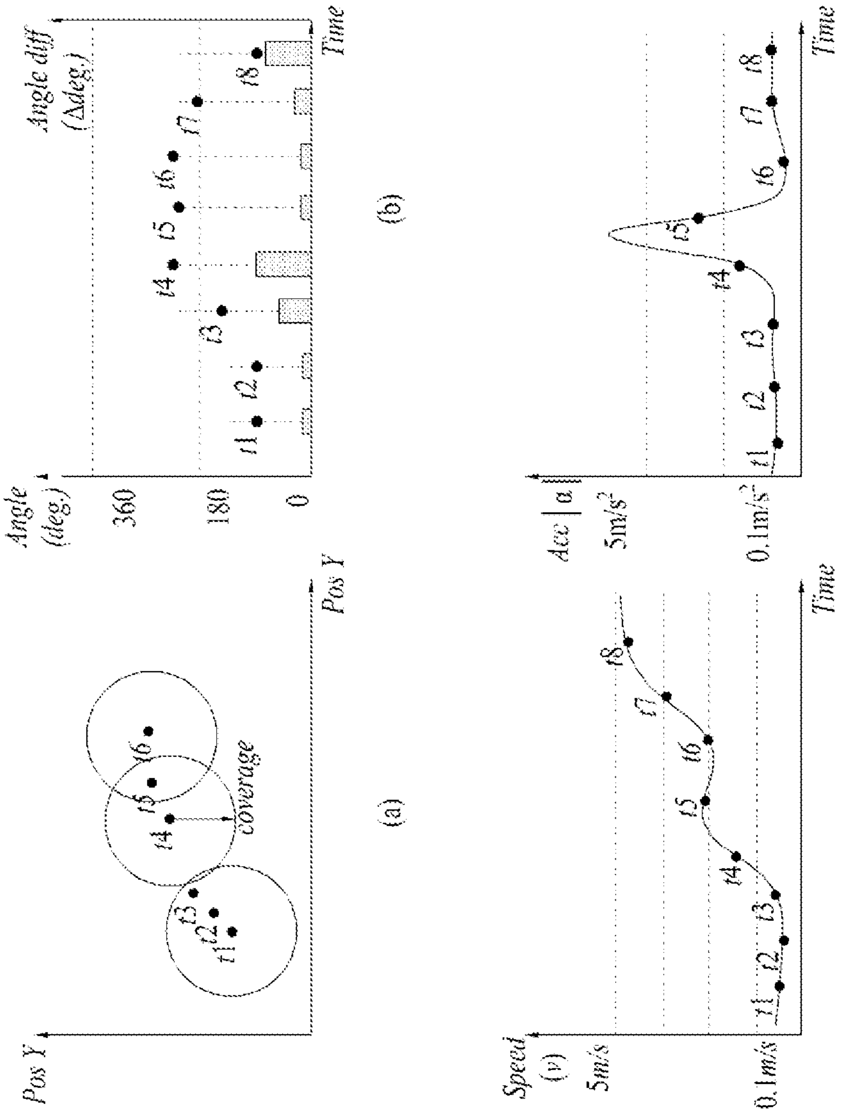
FIG. 12 is a block diagram illustrating how a mobility measurement block collects mobility information about a V2X UE.

FIG. 11 is a block diagram illustrating a V2X UE based on an internal information quantification block, and FIG. 12 is a block diagram illustrating how a mobility measurement block collects mobility information about a V2X UE.

Referring to FIG. 11, a V2X UE may include four stages of configuration: information input blocks 110 and 120, a quantification block 130, an optimal information operation block 140, and application blocks 150, 160, and 170.

The information input blocks 110 and 120 are blocks for inputting and measuring internal information (e.g., status information about the V2X UE), and may include a mobility measurement block 110 and a device status measurement block 120. The mobility measurement block 110 collects position, speed, heading angle, and acceleration information related to the movement information about the V2X UE. It is connected to the V2X UE by a suitable interface (OBD, CAN, Ethernet, etc.) to receive the status of the vehicle or V2X UE. The device status measurement block 120 may collect internal information about the V2X UE (battery status, device installation status) and user status (earphone use, gaming use, video watching, drowsy driving). The information input blocks 110 and 120 may deliver the collected information to the quantification block 130.

Referring to FIG. 12-(*a*), the mobility measurement block 110 may receive a GPS position corresponding to the x and y axes as a position information input. Referring to FIG. 12-(*b*), the mobility measurement block 110 may receive information about a heading angle for measuring the heading direction of the device. Here, the heading angle may be input per unit of time, as the heading direction of the V2X UE with respect to the direction of the true north of the geomagnetic sensor set to 0. In addition, the mobility measurement block 110 may further receive an angular difference (Diff Angle) from the heading angle at the previous unit time. Referring to FIG. 12-(*c*), the mobility measurement block 110 may receive a speed value corresponding to the unit time as a speed information input. Finally, referring to FIG. 12-(*d*), the mobility measurement block 110 may receive acceleration information about the V2X UE as input. Here, the mobility measurement block 110 may receive an absolute value of the acceleration in a unit time as the acceleration information, or may receive an absolute value of the speed difference.

In this way, the information collected or input from the information input blocks 110 and 120 may be input to the quantification block 130. The quantification block 130 may quantify severity or a severity level for the V2X UE based on the information received as input (or, status information about the V2X UE). The quantification block 130 includes a severity quantification block (or severity quantification device) that presents a threat level or severity indicating the risk of an accident, an exposure quantification block (or exposure quantification device) that presents exposure or an exposure level that needs to be handled urgently due to an increased probability of the accident, and a controllability quantification block (or controllability quantification device) that presents a controllability level or controllable level that can be controlled by the V2X UE or a user of the V2X UE when a risk is expected.

As described above, the quantification block 130 may include a quantification block to output a severity level (or first severity level), an exposure quantification block to output an exposure level (or second severity level), and a controllability block to output a controllability level (or third severity level). Hereinafter, a method for outputting each of the severity level, exposure level, and controllability level by each quantification block is described in detail.

Figure 13:
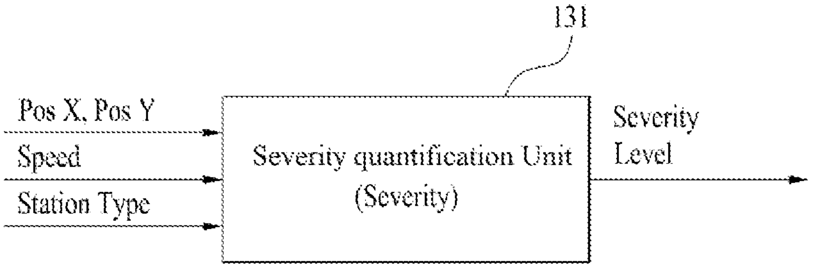
FIGS. 13, 14, and 15 are diagrams illustrating how a severity quantification block outputs severity levels.
Figure 14:
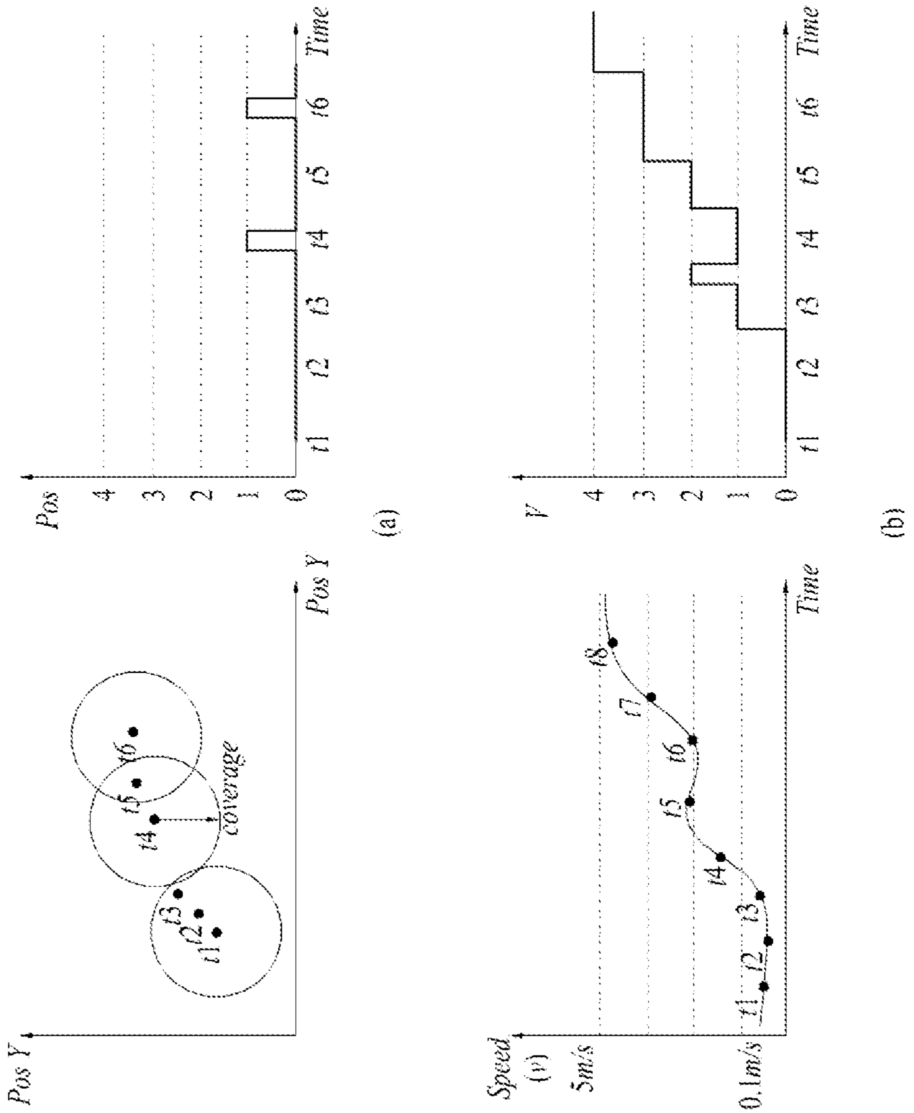
Figure 15:
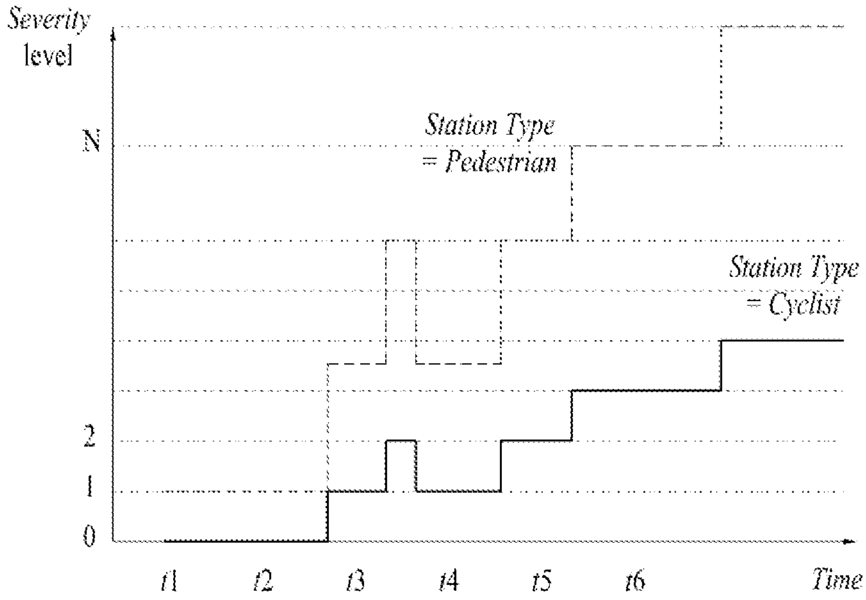

FIGS. 13, 14, and 15 are diagrams illustrating how a severity quantification block outputs severity levels.

Referring to FIG. 13, the severity quantification block 131 may receive as input the position values PosX and PosY and the speed value Speed, and may receive information about the station type from the DeviceStatus input device. The severity quantification block 131 may process the input values and information to output a value of a severity level.

Specifically, referring to FIG. 14-(*a*), the severity quantification block 131 may quantify the position information based on the input position information. The severity quantification block 131 compares the position per unit time, and always outputs "0" (the quantified position level in relation to the position) if the position is not beyond a preset coverage from a previous reference position. Alternatively, if the position is beyond the preset coverage, the severity quantification block 131 may output '1' as a position level or position value quantified in relation to the position, and may reset the coverage based on the current position. For example, at t4 and t6, the position is beyond the existing coverage, and thus the position level may be set to 1. At t1, t2, t3, and t5, the position level may be set to 0.

Referring to FIG. 14-(*b*), the severity quantification block 131 may output a quantified value or speed level for an input speed. The severity quantification block 131 may quantify the input speed value in unit time by quantizing the same based on a preset unit speed, or output a quantified speed level.

As such, the severity quantification block 131 may calculate or output a final severity level or severity level for or corresponding to the position level and speed level using Equation 1 below.

$$\text{Severity} = w_{stationType} \times (w_1 Pos + w_2 V) \quad \text{[Equation 1]}$$

Specifically, referring to Equation 1, the calculated position level Pos and speed level V may be multiplied by weights $w_1$ and $w_2$ and added. The resulting value may be further multiplied by a weight $W_{stationType}$ corresponding to a station type (or station Type) related to the V2X UE to produce a final severity level.

Referring to FIG. 15, the severity level may be calculated by applying a different weight according to the station type. The severity quantification block 131 may calculate an initial severity level based on the input speed and position, and may output a final severity level by applying a different weight to the initial severity level according to the station type. In other words, even for the same V2X UE, different severity levels (or final severity levels) may be calculated by applying different weights depending on whether the station type related to the V2X UE (or the station type set for the V2X UE) is related to a pedestrian or a cyclist (a case where the user is riding a bicycle). For example, even at the same speed level, a situation involving a pedestrian may be more dangerous than a situation involving a cyclist, and thus the severity level may be calculated or adjusted more sensitively through the weighting. In other words, a greater weight may be applied to the case of a pedestrian than to the case of a cyclist, resulting in a relatively higher severity level.

Hereinafter, the exposure quantification block is described in detail.

Figure 16:
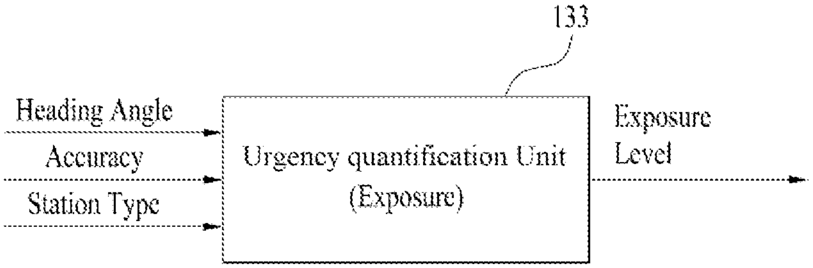
FIGS. 16 and 17 are diagrams illustrating how an exposure quantification block outputs exposure levels.
Figure 17:
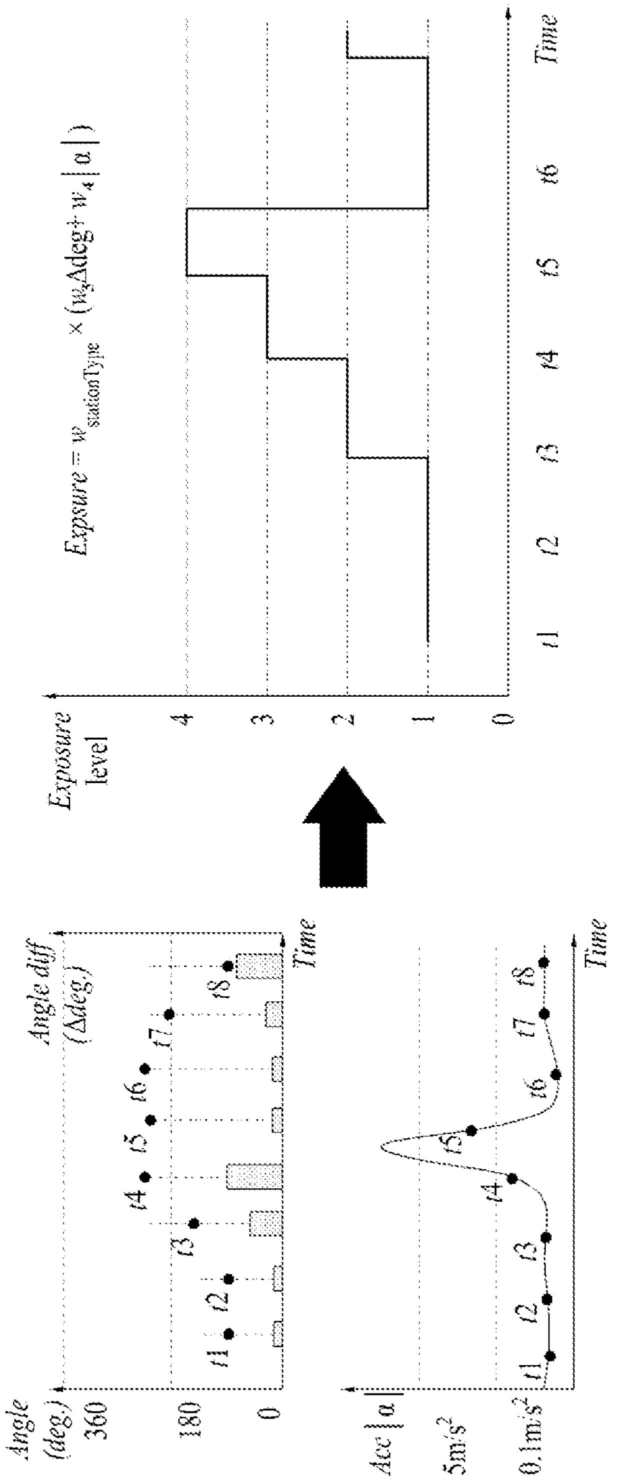

FIGS. 16 and 17 are diagrams illustrating how an exposure quantification block outputs exposure levels.

Referring to FIG. 16, the exposure quantification block 133 may receive, from an information input block, information about a heading angle, which is a heading direction, Accuracy, which is an acceleration value, and StationType. The exposure quantification block 133 may process the input numerical values and information to output an exposure level or a value thereof.

The amount of change in the heading angle, the heading angle level, and the acceleration input from the information input block may be input to Equation 2 below, and the final exposure level may be output.

$$\text{Exposure} = W_{stationType} \times (w_3 * \Delta deg + w_4 * |a|) \quad \text{[Equation 2]}$$

Specifically, the final exposure level may be output by applying weights $w_3$ and $w_4$ to the heading angle difference (deg) and the acceleration level (|a|) measured by the information input block (or input device), respectively, and summing the weighted difference and level, and further applying a weight corresponding to the station type to the sum.

Referring to FIG. 17, the exposure quantification block 133 may output or calculate a final exposure level through values quantified based on the input heading angle and acceleration values. The exposure quantification block 133 may output a relatively lower exposure level when there is no change or a low change in the heading angle and/or acceleration (lower than a preset change threshold) than when there is a high change in the heading angle and/or acceleration (higher than the preset change threshold). Further, as described above, the exposure level may be calculated or output by applying or assigning different weighting depending on the station type.

Figure 18:
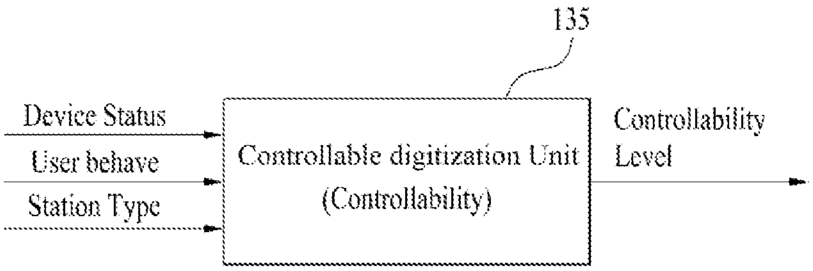
FIGS. 18 and 19 are diagrams illustrating in detail how a controllability quantification block outputs controllability levels.
Figure 19:
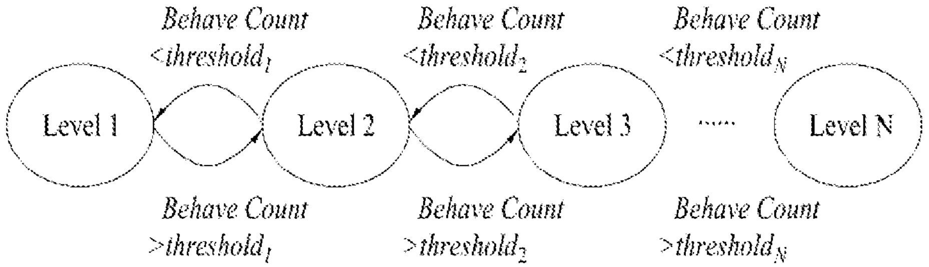

FIGS. 18 and 19 are diagrams illustrating in detail how a controllability quantification block outputs controllability levels.

Referring to FIG. 18, the controllability quantification block 135 may receive information about Device Status, User Behave, and StationType from a device status input block. The controllability quantification block 135 may process the input information or numerical values and output a controllability level or a value thereof.

Specifically, the controllability quantification block 135 may measure or calculate the controllability level using a statue machine. Alternatively, the controllability quantification block 135 may measure or calculate the controllability level based on a behave count. Here, the behave count may be incremented by 1 based on the number of Apps used by the device user (or the user of the V2X UE) that interfere with safety-related operations, including listening to music, and the level may be decremented by 1 based on the number of Apps related to maps that assist in driving (or safety-related operations). In addition, various sensors mounted on the device may detect the battery status of the device, the earphone connection status, the screen on/off status, or the screen staring status, and the behave count may be decremented by 1 if the detected status is helpful for control and incremented by 1 if it is a hindrance.

Referring to FIG. 19, the controllability quantification block 135 may move or switch to each of the level stations, Level 1 to Level N, by comparing the value of the behave count with specific threshold values as described above. The final controllability level may be output as a state of the state machine.

As described above, the internal information about the V2X UE (or the status information about the V2X UE) may be quantified as a severity level, an exposure level, a controllability level, and the like. The severity level, exposure level, controllability level, and the like may finally be used to optimize the operation of the V2X device (or SoftV2X). Hereinafter, the operation of the application block using the levels measured or calculated by the quantification block (or the quantification results) will be described in detail.

Figure 20:
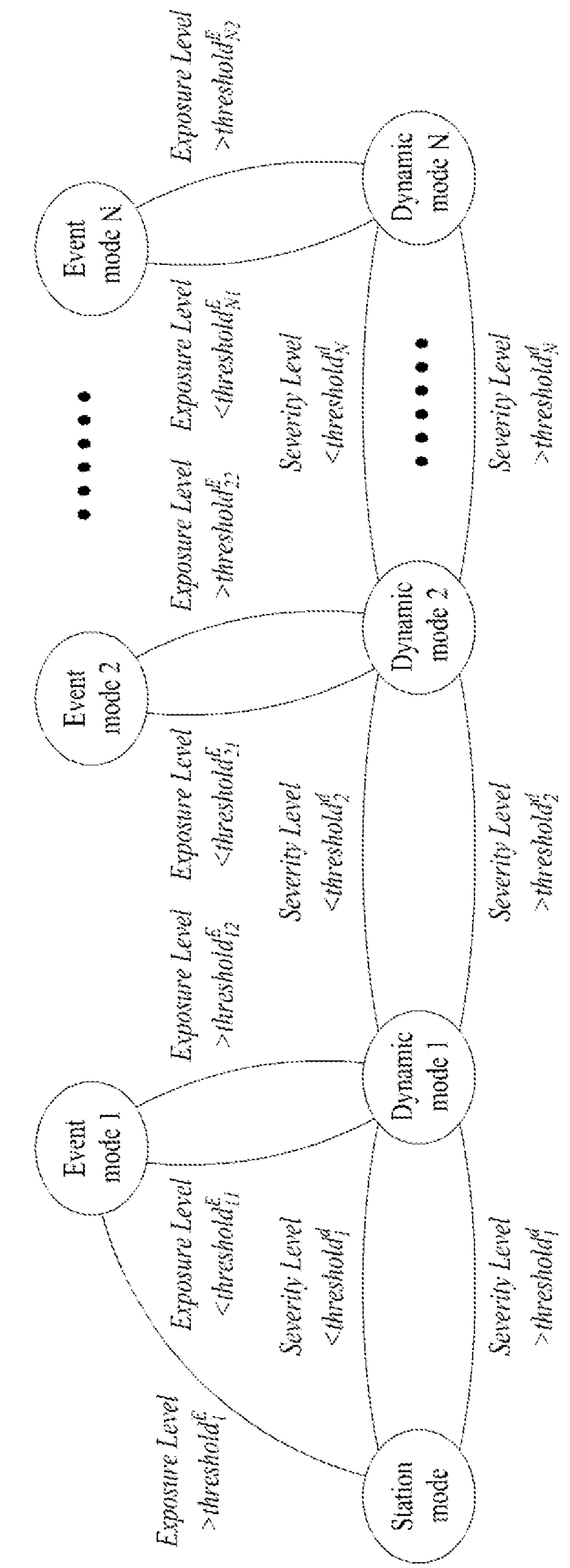
Figure 21:
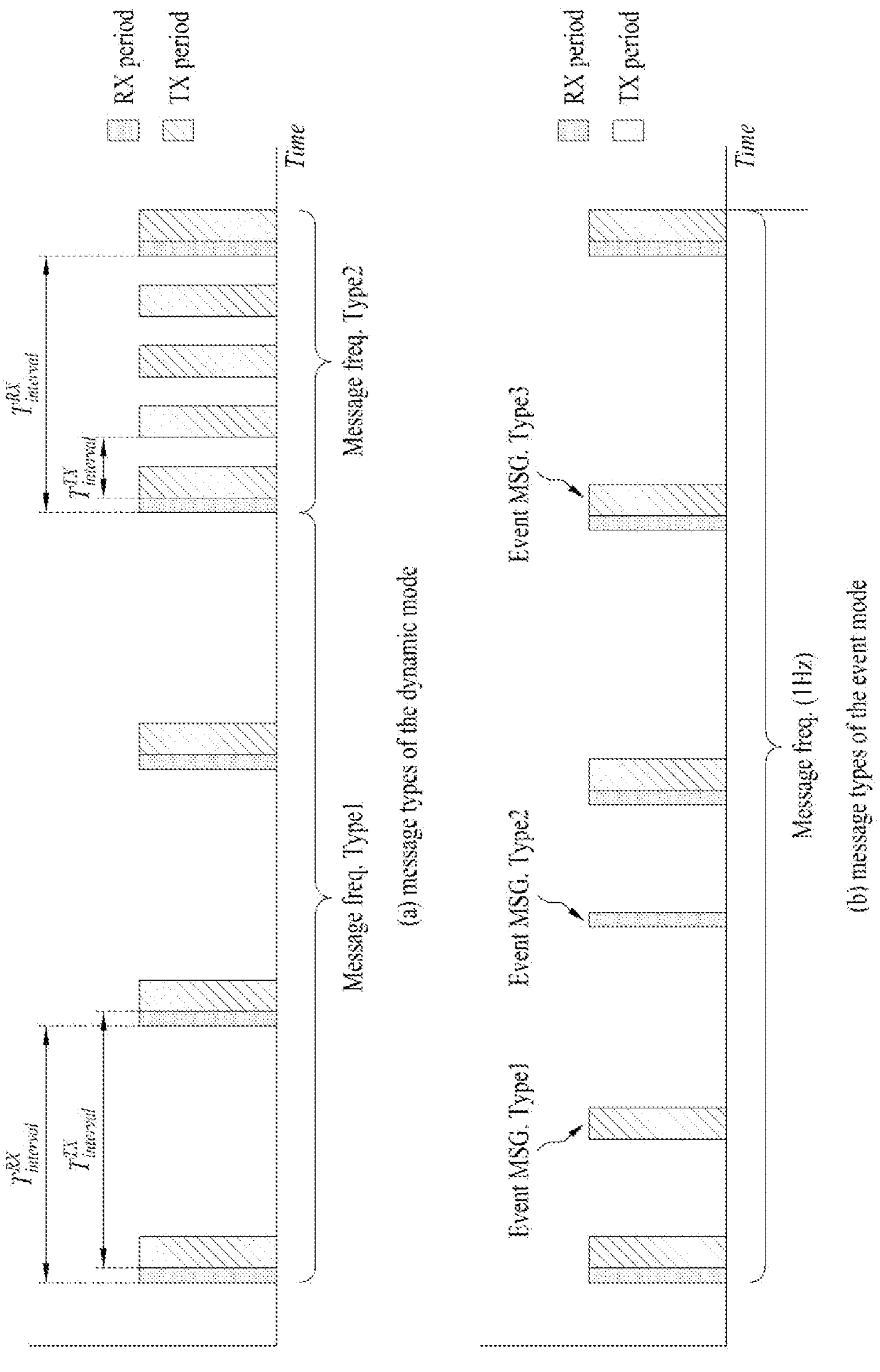

FIGS. 20 and 21 are diagrams illustrating a method for determining a transmission mode of a message based on a severity level, an exposure level, and the like.

Referring to FIG. 20, the application block may change the transmission mode for message transmission of the V2X UE based on the severity level and the exposure level. Here, as shown in FIG. 11, the application block may include a V2X block 150, a GPS controller 160, and an APP controller 170.

The V2X module or V2X block 150 may change the transmission scheme based on the status of the device, in contrast to the periodic transmission of conventional V2X. Specifically, the V2X block 150 may change the transmission scheme to a stationary mode, a dynamic mode or a dynamic mode (Dynamic mode1, 2 . . . , N) through comparison with a severity level and preset first thresholds ($\text{Threshold}_1^d$, $\text{Threshold}_2^d$, . . . , $\text{Threshold}_N^d$). In this case, the transmission/reception interval and power, transmission scheme, and the like may be set or adjusted for each mode. Further, the V2X block 150 may change the transmission scheme to an event mode through comparison with an exposure level representing an exposure and preset second thresholds ($\text{Threshold}_1^E$, $\text{Threshold}_{11}^E$, $\text{Threshold}_{12}^E$, $\text{Threshold}_{21}^E$, $\text{Threshold}_{21}^E$, $\text{Threshold}_{22}^E$, . . . , $\text{Threshold}_{N1}^E$ $\text{Threshold}_{N2}^E$). In the event mode, the transmission scheme and the transmission message may be modified. In particular, the second thresholds may be configured asymmetrically $$(\text{threshold}_{11}^E, \text{threshold}_{12}^E),$$

and the steps of triggering and releasing the emergency situation may be adjusted.

Referring to FIG. 21, the message transmission interval may be adjusted for each of the above-described transmission modes. In the stationary mode, the transmission interval of the message or a preset maximum transmission interval such as message freq. type1 may be set. In other words, the transmission interval may be set according to the value of $$T_{interval}^{TX},$$

the reception interval may be set according to $$T_{interval}^{RX},$$

and data or a message may be received from the server according to the reception interval.

When the transmission mode is changed to the dynamic mode due to an increase in the severity level, the transmission/reception interval is further shortened to allow more data or messages to be transmitted and received, and the safety level related to the V2X UE may be improved. In this way, the transmission/reception intervals may be adjusted based on preconfigured parameters for each mode. As shown in FIG. 21, in the dynamic mode, the reception interval may be the same as the reception interval in the stationary mode as in message freq. type 2, but the transmission interval may be reduced to one-quarter of the transmission interval in the stationary mode. Thus, the dynamic mode allows a message to be transmitted more frequently than the stationary mode.

Table 5 below is an embodiment of a table showing transmission and reception intervals set for each transmission mode (or message type). The transmission and reception intervals $$(T^{TX}_{interval}, T^{RX}_{interval})$$

for each mode may be preset as shown in Table 5. The numerical values in Table 5 represent one embodiment and may be optimized for the system and surrounding conditions in the implementation.

TABLE 5

| Message Type (or transmission mode) | $T^{TX}_{interval}$ | $T^{RX}_{interval})$ |
|---|---|---|
| Stationary mode | 1000 ms | 1000 ms |
| Dynamic mode 1 | 500 ms | 500 ms |
| Dynamic mode 2 | 100 ms | 500 ms |
| Dynamic mode 3 | 100 ms | 100 ms |
| . . . | . . . | . . . |
| Dynamic mode N | 20 ms | 20 ms |

Alternatively, when the exposure level is greater than or equal to a preset second threshold, the transmission mode may be changed or switched to an event mode. In this case, the V2X block may immediately transmit, receive, or transmit and receive the message regardless of the set transmission interval. For example, as illustrated in FIG. 20, the event messages in the event mode may be transmitted and received immediately, as in types 1, 2, and 3.

Alternatively, the operation optimization block (or the optimal application operation block of FIG. 11) may efficiently operate a GPS module consuming a large amount of battery power based on level values. Here, the GPS module may be operated according to the situation to assist a battery-powered device, such as a smartphone, as opposed to a conventional method of maximizing the use of the GPS mode. Specifically, for the GPS module, the GPS mode (or, positioning mode) may be adjusted by comparing a movement level and a preset third threshold. Here, the movement level may be calculated by weighting the severity level, exposure level, and controllability level values and summing the weighted values as shown in Equation 3 below.

$$\text{Level}_{Movement} = \text{LEVEL} \times \text{Weight} = [\text{Level}_S \;\; \text{Level}_E \;\; \text{Level}_C] \times \begin{bmatrix} w_S \\ w_E \\ w_C \end{bmatrix}$$

As a method for measuring the location of the V2X UE, the IMU method utilizing a geomagnetic field and an acceleration sensor may be used. The IMU method consumes a lower battery power than the GPS method. Alternatively, a GPS module may be operated to obtain higher precision. In particular, more accurate GPS positioning may be performed by using differential GPS (DGPS) and real-time kinetic (RTK), which have recently been introduced to supplement GPS positioning. Furthermore, to achieve higher positioning performance, the technology of sidelink positioning of PC5 through communication with nearby vehicles may be used. However, as the precision increases, the battery power and processing power consumed for positioning may increase. Alternatively, increasing the accuracy of positioning may significantly increase the battery power consumption due to the increase in processing power consumption.

Hereinafter, a method for changing the positioning mode according to the movement level for the motion optimization block to efficiently manage the power of the battery will be described in detail.

Figure 22:
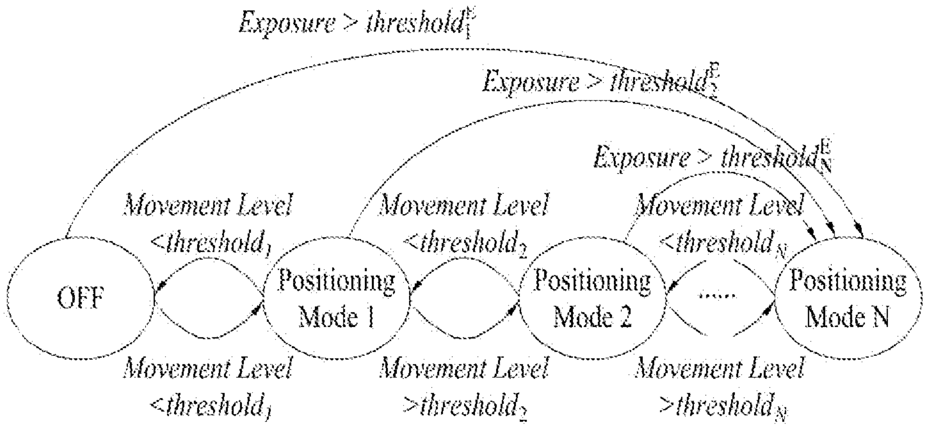
FIG. 22 is a diagram illustrating how an operation optimization block sets a positioning mode based on a movement level.
Figure 22:
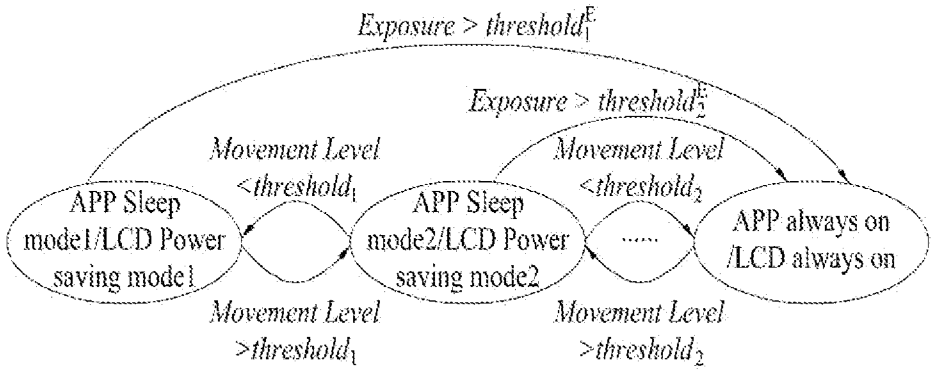

FIG. 22 is a diagram illustrating how the operation optimization block sets a positioning mode based on a movement level.

Referring to FIG. 22-(*a*), the motion optimization block may change or switch the positioning mode based on the above-described movement level and/or exposure level. Here, the positioning mode may be set to a positioning mode using an IMU when the movement level (or movement) is low: As the movement level (or movement) increases, the mode may be changed or switched to a positioning mode in which the positioning is more accurate because the severity increases. For example, as the movement level increases, the positioning mode may change from a positioning mode utilizing a GPS module to a positioning mode in which a more advanced positioning method (e.g., using PPP-RTK, Sidelink positioning, Advanced GPS, etc.) is set.

Alternatively, in the case where the V2X UE is stationary and does not move for a certain period of time, the positioning mode may be set or changed to a positioning mode that disables all positioning devices (positioning module Off). Further, besides the movement level, the exposure level may also be considered. For example, in the case of a sharp increase in the exposure level (or in the case where the exposure level is greater than or equal to one of the second thresholds), the mode may be immediately switched or set to a positioning mode that enables the most precise positioning, regardless of the positioning mode according to the movement level. Alternatively, in the case of a sharp increase in the exposure level, the block may move to the state machine such that the most precise positioning mode can be used immediately regardless of the movement level.

Referring to FIG. 22-(*b*), the APP controller (or application control block) may operate the APP, LCD, and/or human machine interface (HMI) according to the movement level. The APP controller may set or change the APP and LCD modes (or APP sleep mode and LCD power saving mode, internal operation mode) by comparing the movement level and the preset third thresholds. For example, when the movement level or the like is high and the likelihood of a risk occurring is high, the APP controller may change or switch the mode to an APP and LCD mode (or an internal operation mode) in which both the APP and the LCD are turned on regardless of battery power consumption to ensure the safety of the user of the V2X UE. Alternatively, when safety is more or less secured (e.g., a relatively low value of the movement level is calculated), the APP controller may change or switch the mode to the APP and LCD mode (or internal operation mode) in which the APP is turned on and only the LCD is turned off to reduce the battery power consumption of the V2X UE. Alternatively, when the user of the V2X UE is in a stationary state (or when the movement level is 0 as the user is resting in a chair in a safe area, or when the user is recognized as being in a safe state based on the severity level of the device), the APP controller may change or set the mode to an APP and LCD mode (or hibernation mode) in which the APP is set in the sleep mode and the LCD is turned off to minimize the battery power consumption of the V2X UE.

As shown in Table 6 below; a method of operating the APP and LCD for each state (or each APP and LCD mode) may be preconfigured. For example, when the movement level is very low (e.g., movement level=0)), that is, when the user of the V2X UE can cope with an accident or when the probability of an accident is low due to low severity, the APP controller may set state 1 (or APP and LCD mode 1) to set the sleep time of the APP to the maximum value (1 s) and turn off the LCD. If said APP controller changes state 1 to a higher state (state 2 to state N) in response to an increase in the movement level, the sleep time of the APP may gradually decrease and the brightness of the LCD may gradually increase as the LCD is turned on. Alternatively, in the case where the movement level increases significantly, and thus the severity increases or the exposure increases significantly (in the case where an urgent event occurs), the APP controller may change the state to a state (i.e., state N) where the sleep time of the APP is minimized and the brightness of the LCD is maximized such that the safety of the user is ensured to the greatest extent possible. In other words, the APP controller may minimize the sleep time of the APP and maximize the brightness of the LCD to ensure that the maximum amount of information is provided to the user. The numerical values in Table 6 represent one embodiment, and may be optimized according to the system and surrounding conditions in the implementation.

TABLE 6

| Message Type (or transmission mode) | Sleep time | LCD level |
|---|---|---|
| State 1 (or APP and LCD mode 1) | 1 s | Off |
| State 2 (or APP and LCD mode 2) | 500 ms | Off |
| State 3 (or APP and LCD mode 3) | 100 ms | LCD bright level 1 |
| State 4 (or APP and LCD mode 4) | 100 ms | LCD bright level 2 |
| . . . | . . . | . . . |
| State N (or APP and LCD mode N) | Always on | Always on (setting Max) |

As described above, it is proposed that the V2X UE analyze the internal information (or the status information about the V2X UE) to quantify the internal information (or the status information about the V2X UE) into a severity level, exposure level, and controllability level, such that the V2X UE can be efficiently operated (with a position recognition block, a V2X communication block, an LCD control block, and an App operation) based on the results of the quantification. In this case, the battery of the battery-based V2X UE may be efficiently operated through efficient device operation according to the situation of the V2X UE.

Next, a method for providing information about the quantification result to nearby devices through a V2X message or the like to allow the V2X UE to recognize and respond to the situation of the V2X UE will be described. For example, when the V2X message or the like indicates that a user of the V2X UE is listening to a song and that it is difficult for the user to respond appropriately, nearby devices may be more cautious or respond appropriately to the situation. To this end, it may be necessary to add additional information-carrying fields to the existing V2X message. The structure of such a message will be described in detail below.

Figure 23:
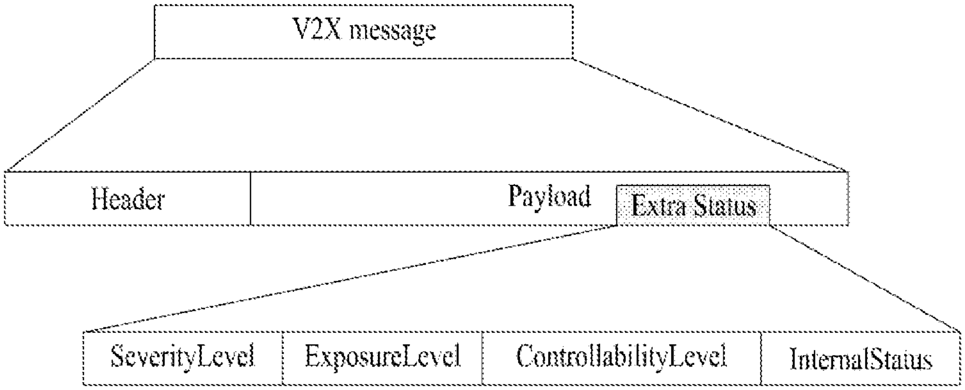
FIG. 23 is a diagram illustrating a structure of a V2X message that may include a quantification result.

FIG. 23 is a diagram illustrating a structure of a V2X message that may include a quantification result. Here, the quantification result may include a severity level, an exposure level, and a controllability level as described above.

Referring to FIG. 23, "ExtraStatus" information may be additionally carried in the existing V2X message (CAM, VAM, BSM or PSM). The "ExtraStatus" information may be represented by "DF_ExtraStatus".

DF_ExtraStatus may be represented as a sequence and may include Severity Level, ExposureLevel, and Controllability Level for the quantification result (severity level, exposure level, and controllability level values) described above. The quantification result is represented as an integer and may be represented through a number in the range of 0 to 10.

GpsStatus and LcdStatus may also indicate the control status of internal operation to the surroundings through numerical values. The values of GpsStatus and LcdStatus are composed of integers and each value may be used to indicate the settings of the device. For example, among the values of GpsStatus, 0 may indicate that the position is unknown, 1 may indicate that the position is measured using an IMU sensor, 2 may indicate that a GPS module is used, and 3 may indicate the use of DGPS, and 4 may indicate the use of RTK. Among the values of LcdStatus, 0 may indicate that the LCD status is unknown, 1 may indicate that the LCD of the device is off, and 2 may indicate that the LCD of the device is on.

As such, according to the above-described embodiments, the internal information about a V2X UE (or VRU device) may be quantified, and the V2X UE may be operated efficiently based on the quantification result. In this case, unlike V2X transmission algorithms and peripheral device operations adapted to conventional broadcast-based V2X devices installed in vehicles, V2X UEs or VRU devices using battery-based Uu interfaces such as mobile phones may efficiently ensure user safety while minimizing battery power consumption.

Figure 24:
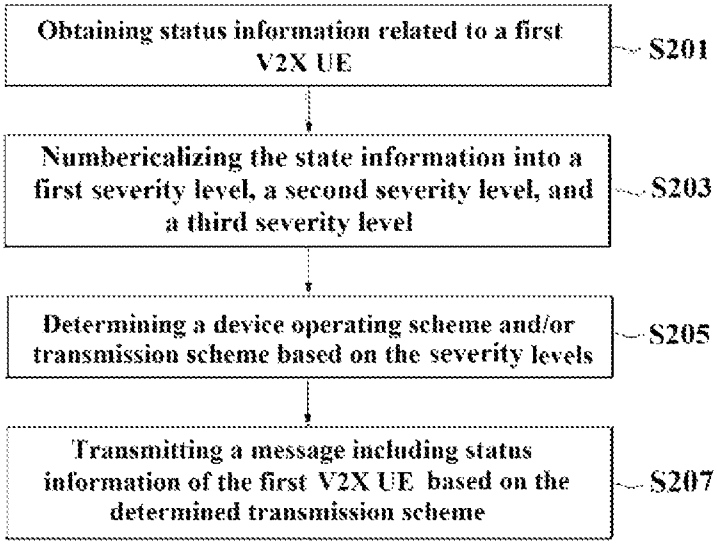
FIG. 24 is a diagram illustrating a method for operating a first V2X UE based on a quantification result of quantifying status information related to the first V2X UE.

FIG. 24 is a diagram illustrating a method for operating a first V2X UE based on a quantification result of quantifying status information related to the first V2X UE.

Referring to FIG. 24, the first V2X UE may obtain status information related to the first V2X UE using a sensor or the like (S201). The status information may include mobility information, change amount information, internal status information, and station type information.

The mobility information may include information about the position and movement speed of the first V2X UE, and the change amount information may include information about the amount of change in the heading angle and the acceleration, which is the amount of change in the speed. Alternatively, the amount of change in the heading angle may be obtained based on time-specific heading angles obtained through the sensor or the like as described above. The internal status information may include information about the number of applications running on the first V2X UE, types of the applications, battery status, status of connection to an external output device, operation status of a display, and whether a user of the first V2X UE is viewing the display. Also, the station type information may be information about the type of transportation related to the first V2X UE or the user of the first V2X UE, such as a bicycle, a pedestrian, a wheelchair, or a motorcycle.

The first V2X UE may quantify the status information into a first severity level, a second severity level, and a third severity level (S203). Specifically, the first V2X UE may quantify the movement information into the first severity level. As described with reference to FIG. 14, the first V2X UE may quantize the position level calculated based on the degree of out-of-coverage with respect to the position at a specific time and the movement speed based on a preset unit speed to calculate the speed level, and may calculate the first severity level, which is a severity, based on Equation 1. Here, as described with reference to FIG. 15 and Equation 1, the first severity level may be calculated by applying a weight corresponding to the station type information.

Further, the first V2X UE may calculate the second severity level, which is a corresponding exposure, by inputting the amount of change in the heading angle and the absolute value of the acceleration to Equation 2, as described with reference to FIG. 17. Here, the second severity level may also be calculated by applying a weight corresponding to the station type information as shown in Equation 2.

Further, the first V2X UE may calculate the behave count value by adding an integer corresponding to the number of applications (apps) that interfere with the safety of the user of the first V2X UE based on the internal status information as described with reference to FIG. 18, and subtracting an integer corresponding to the number of applications (apps) that are helpful for the safety of the user of the first V2X UE. Furthermore, the first V2X UE may calculate the behave count value by assigning +1 to each of the cases where the battery condition is poor, an external output device such as an earphone is connected, the display is off, or the user is not viewing the screen, and −1 to each of the cases where the battery condition is good, an external output device such as an earphone is not connected, the display is on, or the user is viewing the screen. In this case, as described with reference to FIG. 19, the first V2X UE may calculate or determine a third severity level, which is a controllability level, by comparing the behave count value with specific thresholds. Further, the third severity level may be calculated by applying a weight corresponding to the station type information.

Alternatively, the first V2X UE may calculate a fourth severity level, which is an overall movement level, based on the first severity level, the second severity level, and the third severity level. As shown in Equation 3, the fourth severity level may be calculated by adding a corresponding weight to each of the first severity level, the second severity level, and the third severity level, and then obtaining the sum of the weighted levels (i.e., weighted sum).

In this way, the first V2X UE may quantify the status information by dividing the status information into the first severity level, the second severity level, and the third severity level. Further, the first V2X UE may calculate the fourth severity level based on the weighted sum of the plurality of quantified severity levels.

Next, the first V2X UE may determine an operation scheme for the first V2X UE and/or a transmission scheme for the message based on at least one of the first severity level, the second severity level, and the third severity level (S205).

Specifically, the first V2X UE may have a plurality of pre-configured transmission modes, and may determine and/or set one transmission mode among the plurality of transmission modes based on the first severity level and a first threshold, as described with reference to FIG. 20. For the plurality of transmission modes, corresponding transmission and reception intervals may be preset as shown in Table 5. In this case, said first V2X UE may transmit the message at the transmission and reception intervals set for the one determined transmission mode. Here, it may be preset to have shorter transmission and reception intervals as the value or level of the transmission mode increases, as defined in Table 5.

Alternatively, a plurality of event modes may be preconfigured for the first V2X UE. The first V2X UE may set or determine one event mode among the plurality of event modes based on the second severity level and a second threshold, as described with reference to FIG. 20. Upon switching to that one event mode, the first V2X UE may transmit the message immediately at the time of switching to the event mode, regardless of the transmission and reception intervals of the one transmission mode. The message may be modified to further include information about an emergency situation in response to the event mode. In other words, the message in the transmission mode and the message in the event mode may be different types of messages.

Alternatively, the first V2X UE may have the plurality of positioning modes preconfigured, and may determine one positioning mode among the plurality of positioning modes based on the fourth severity level. Here, the plurality of positioning modes may be preconfigured to correspond to at least one positioning method among the plurality of positioning methods. For example, the plurality of positioning modes may be preconfigured to correspond to at least one positioning method having a higher accuracy as the value of the positioning mode increases. The plurality of positioning methods may include a power-saving mode method of turning off all positioning devices, an inertial measurement unit (IMU) based positioning method, a global positioning system (GPS) based positioning method, a differential global positioning system (DGPS) based positioning method, a real time kinematic (RTK) based positioning method, and a positioning method using wireless communication. For example, the positioning mode of the lowest level or value may be preconfigured to turn off all the positioning devices, or to correspond to the IMU-based positioning method with the lowest accuracy. Alternatively, the positioning mode of the highest level or value may be preconfigured to correspond to at least one of the DGPS based positioning, the RTK based positioning, and the positioning method using wireless communication that have the highest accuracy. Specific positioning methods are described in detail with reference to FIG. 22.

Alternatively, as described with reference to FIG. 22, the first V2X UE may have a plurality of internal operation modes preconfigured, and may determine one internal operation mode among said plurality of internal operation modes based on the fourth severity level. The plurality of internal operation modes may have preconfigured parameters for sleep timing of the application, adjustment of the brightness of the display included in the first V2X UE, and/or adjustment of the human machine interface (HMI). For example, as shown in Table 6, the sleep timing of the application (App) and the operation mode of the LCD (display) may be preconfigured for the first V2X UE in response to each of the plurality of internal operation modes. For example, as shown in Table 6, in the internal operation mode with the lowest level or value among the plurality of internal operation modes, the sleep timing may be set to the maximum and the LCD may be set to OFF. In the internal operation mode with the highest level or value among the plurality of internal operation modes, the sleep timing may be set to zero (i.e., the application is always active) and the brightness of the LCD may be set to maximum and always ON.

Next, the first V2X UE may transmit a message including status information about the first V2X UE based on a transmission/reception interval (and/or transmission power) corresponding to the transmission mode and/or a message type corresponding to the event mode (S207). Here, the message may be a V2X message, and may further include information about the first severity level, the second severity level, the third severity level, and/or the internal status as the status information about the first V2X UE, as shown in FIG. 23. Here, the information about the internal status may include information about the positioning method currently configured for the first V2X UE and the LCD status, as shown in FIG. 23. In this case, the first V2X UE may transmit the message including the information about the first severity level, the second severity level, and the third severity level to inform the nearby V2X UEs of the severe situation of the first V2X UE.

Figure 25:
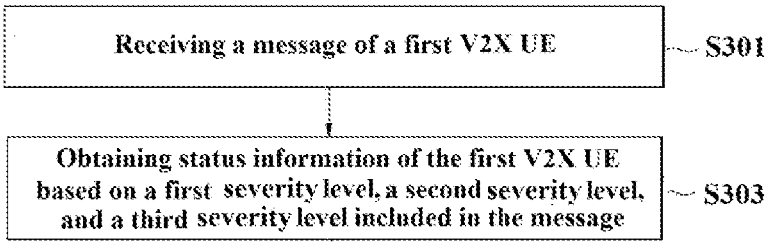
FIG. 25 is a diagram illustrating a method for obtaining information about a status of the first V2X UE by a second V2X UE based on a received message from the first V2X UE.

FIG. 25 is a diagram illustrating a method for obtaining information about a status of the first V2X UE by a second V2X UE based on a received message from the first V2X UE.

Referring to FIG. 25, the second V2X UE may receive a message from the first V2X UE (S301). The message may include a first severity level, a second severity level, and a third severity level into which the status information about the first V2X UE is quantified, as described in FIG. 24. The message may further include information about an internal status of the first V2X UE.

Next, the second V2X UE may recognize or obtain the status information about the first V2X UE based on the first severity level, the second severity level, and the third severity level included in the message (S303).

In this case, as described with reference to FIG. 24, the first severity level, the second severity level, and the third severity level are weighted and calculated based on a station type related to the first V2X UE, and accordingly the second V2X UE may perform an operation to more actively protect safety vulnerable V2X UEs.

In this way, the V2X UE may quantify the status information about the first V2X UE into a plurality of severity levels and determine a message transmission scheme and an operation scheme of the first V2X UE based on the plurality of severity levels, thereby minimizing the battery power consumption of the V2X UE. Furthermore, based on the first severity level into which the information about the movement speed and position is quantified, the battery power consumption of the first V2X UE may be minimized by setting a longer transmission/reception interval of the message in a situation where the severity of the user of the first V2X UE is low, and setting a shorter transmission/reception interval in a situation where the severity of the user of the first V2X UE is high, Thereby, the safety of the user of the first V2X UE may be ensured as much as possible. Furthermore, when the occurrence of an emergency situation is detected for the user of the first V2X UE according to the second severity level into which the information about the change of the heading angle and the acceleration is quantified, a message type to inform the user of the emergency situation may be determined, and a message of the message type may be transmitted immediately, thereby ensuring the safety of the user as much as possible. The third severity level, quantified based on the internal status information about the first V2X UE and the status information about the user of the first V2X UE, may enable optimization of the transmission scheme for the message or the operation scheme of the device according to whether the user can cope with the severe situation. Furthermore, based on the first severity level, the second severity level, and the third severity level, the positioning method for the first V2X UE and the operation mode of the display may be determined, thereby allowing the V2X UE to be operated effectively according to the situation of the user.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 26:
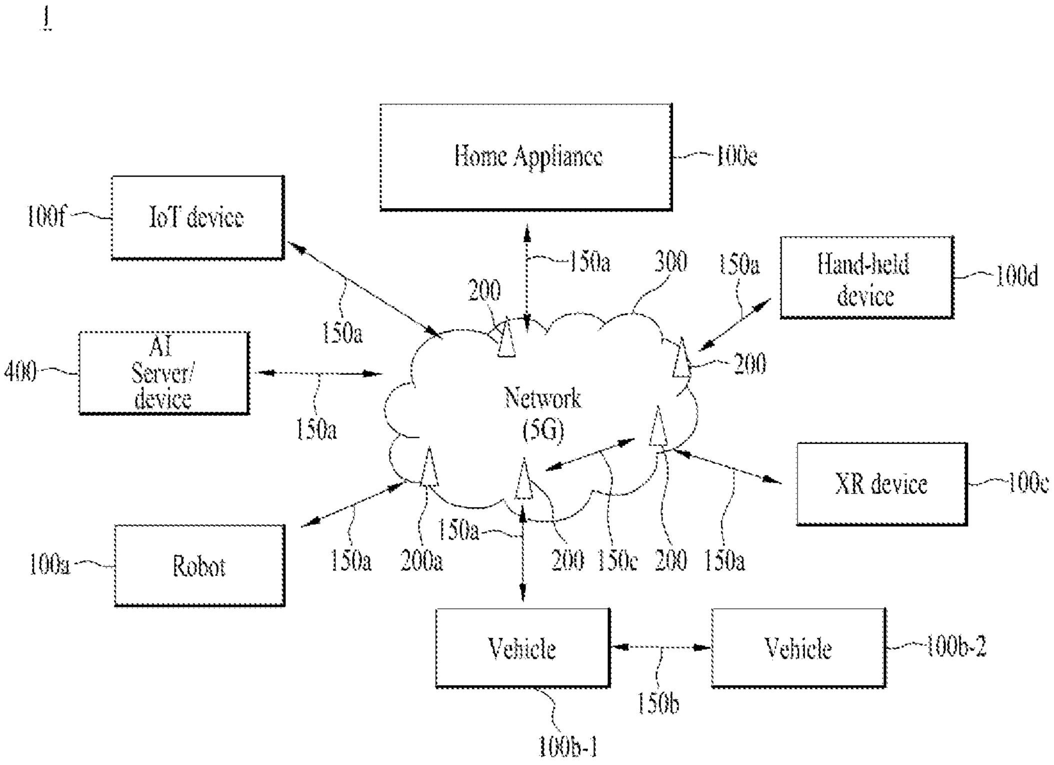
FIG. 26 illustrates a communication system applied to the present disclosure.

FIG. 26 illustrates a communication system applied to the present disclosure.

Referring to FIG. 26, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 27:
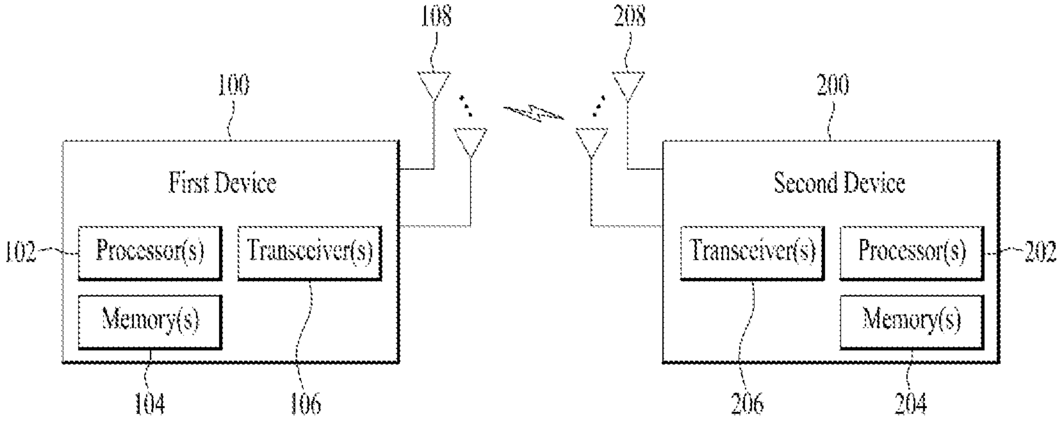
FIG. 27 illustrates wireless devices applicable to the present disclosure.

FIG. 27 illustrates a wireless device applicable to the present disclosure.

Referring to FIG. 27, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 26.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

According to one example, the first wireless device 100 or the first V2X UE may include a processor 102 coupled to the transceiver 106 or RF transceiver and a memory 104. The memory 104 may include at least one program capable of performing operations related to the embodiments described with reference to FIGS. 11 to 25.

Specifically, the processor 102 may obtain status information related to the first V2X UE, quantify mobility information included in the status information into a first severity level, change amount information included in the status information into a second severity level, and internal status information about the first V2X UE included in the status information into a third severity level, and transmit the message based on the status information. Weights determined based on a station type included in the status information may be applied to the first severity level, the second severity level, and the third severity level, respectively.

Alternatively, a chipset including the processor 102 and the memory 104 may be configured. In this case, the chipset may include at least one processor and at least one memory operatively coupled to the at least one processor and, when executed, causing the at least one processor to perform operations. The operations may include obtaining status information related to the first vehicle to everything (V2X) terminal, quantifying mobility information included in the status information into a first severity level, change amount information included in the status information into a second severity level, and internal status information about the first V2X UE included in the status information into a third severity level, and transmitting the message based on the status information. Weights determined based on a station type included in the status information may be applied to the first severity level, the second severity level, and the third severity level, respectively. Further, the at least one processor may perform operations for any of the embodiments described with reference to FIGS. 11 to 25 based on a program included in the memory.

Alternatively, there is provided a computer-readable storage medium including at least one computer program that causes the at least one processor to perform operations. The operations may include obtaining status information related to the first vehicle to everything (V2X) terminal, quantifying mobility information included in the status information into a first severity level, change amount information included in the status information into a second severity level, and internal status information about the first V2X UE included in the status information into a third severity level, and transmitting the message based on the status information. Weights determined based on a station type included in the status information may be applied to the first severity level, the second severity level, and the third severity level, respectively. Further, the computer program may include programs capable of performing the operations for the embodiments described with reference to FIGS. 11 to 25.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s)

202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

According to one example, the second wireless device 200 or the second V2X may include a processor 202 coupled to the transceiver 206 or RF transceiver and a memory 204. The memory 204 may include at least one program capable of performing operations related to the embodiments described with reference to FIGS. 11 to 25.

Specifically, according to one embodiment, the processor 202 may control the transceiver 206 or RF transceiver to receive a message from the first V2X UE, and obtain status information about the first V2X UE based on the message. The status information about the first V2X UE may include a first severity level obtained by quantifying mobility information about the first V2X UE, a second severity level obtained by quantifying mobility change amount information about the first V2X UE, and a third severity level obtained by quantifying internal status information about the first V2X UE. Weights determined based on a station type related to the first V2X UE are applied to the first severity level, the second severity level, and the third severity level, respectively.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP. RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 28:
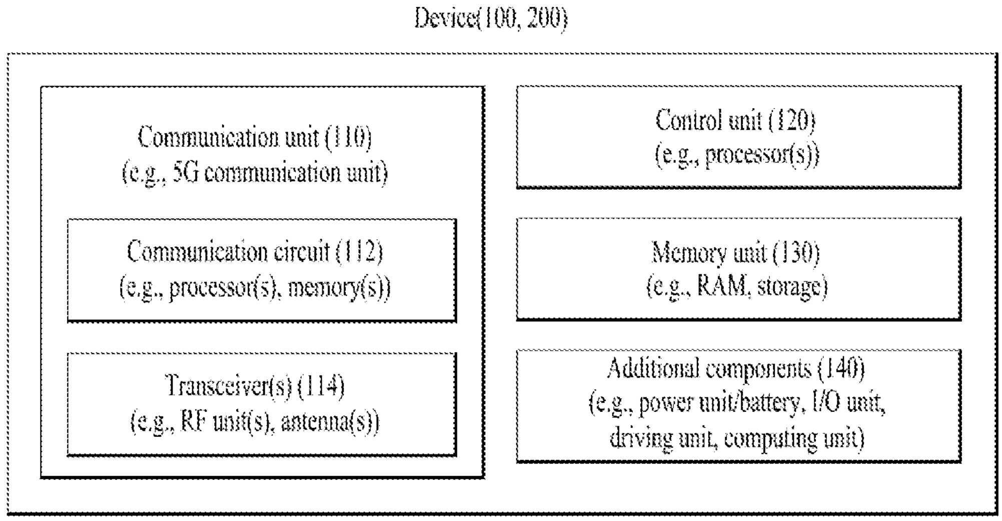
FIG. 28 illustrates another example of a wireless device to which the present disclosure is applied.

FIG. 28 illustrates another example of a wireless device applied to the present disclosure. The wireless device may be implemented in various forms according to a use-case/service (refer to FIG. 26)

Referring to FIG. 28, wireless devices 100 and 200 may correspond to the wireless devices 100 and 200 of FIG. 27 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 27. For example, the transceiver(s) 114 may include the one or more transceivers 106 and 206 and/or the one or more antennas 108 and 208 of FIG. 27. The control unit 120 is electrically connected to the communication unit 110, the memory 130, and the additional components 140 and controls overall operation of the wireless devices. For example, the control unit 120 may control an electric/mechanical operation of the wireless device on based programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 26), the vehicles (100*b*-1 and 100*b*-2 of FIG. 26), the XR device (100*c* of FIG. 26), the hand-held device (100*d* of FIG. 26), the home appliance (100*e* of FIG. 26), the IoT device (100*f* of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 26), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, wireless communication technologies implemented in the wireless devices (XXX, YYY) of the present specification may include LTE, NR, and 6G, as well as Narrow band Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network including a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various.

The invention claimed is:

1. A method by a first vehicle-to-everything user equipment (V2X UE) comprising:

obtaining status information related to the first V2X UE; and transmitting a message based on the status information, wherein the status information comprises mobility information for the first V2X UE, mobility change information for the first V2X UE, internal status information for the first V2X UE, and station type information, wherein the first V2X UE quantifies the mobility information into a first severity level, quantifies the mobility change information into a second severity level, and quantifies the internal status information into a third severity level, wherein each of the first severity level, second severity level, and third severity level is applied with a weight determined based on the station type information, wherein the first V2X UE determines one transmission mode among a plurality of preconfigured transmission modes based on the first severity level, and wherein the message is transmitted based on transmission and reception intervals and transmission power configured for the one transmission mode.

2. The method of claim 1, wherein, based on the second severity level being higher than or equal to a preset threshold level, the one transmission mode is switched to an event mode, wherein, based on the one transmission mode being switched to the event mode, the message is transmitted immediately, regardless of the transmission and reception intervals.

3. The method of claim 1, wherein the first V2X UE determines a positioning mode based on a fourth severity level calculated based on a weighted sum of the first severity level, said second severity level, and said third severity level, wherein a position of the first V2X UE is measured based on at least one positioning method configured for the determined positioning mode.

4. The method of claim 3, wherein the at least one positioning method is at least one of a power saving mode method of turning off all positioning devices, an inertial measurement unit (IMU) based positioning method, a global positioning system (GPS) based positioning method, a differential global positioning system (DGPS) based positioning method, a real time kinematic (RTK) based positioning method, or a positioning method using wireless communication.

5. The method of claim 4, wherein, based on the second severity level being higher than or equal to a preset threshold level, the first V2X UE switches to a positioning mode in which a positioning method capable of most precise positioning is configured.

6. The method of claim 1, wherein the first V2X UE determines an internal operation mode for the first V2X UE based on a fourth severity level calculated based on a weighted sum of the first severity level, the second severity level, and the third severity level, wherein the internal operation mode has parameters preconfigured to control at least one of a sleep timing of an application included in the first V2X UE, a display included in the first V2X UE, or a human machine interface (HMI) included in the first V2X UE.

7. The method of claim 1, wherein the mobility information comprises information about a position and speed of the first V2X UE, wherein the mobility change information comprises information about an amount of change in heading direction and acceleration of the first V2X UE.

8. The method of claim 1, wherein the internal status information comprises the number of applications running on the first V2X UE, types of the applications, a battery status, a connection status of an external output device, an operation status of a display, and information about whether a user of the first V2X UE is viewing the display.

9. The method of claim 1, wherein the message contains information about the first severity level, the second severity level, and the third severity level.

10. The method of claim 1, wherein the first V2X UE transmits the message containing information about the first severity level, the second severity level, and the third severity level to inform nearby V2X UEs of a severe situation of the first V2X UE.

11. A first vehicle-to-everything user equipment (V2X UE) comprising:

a radio frequency (RF) transceiver; and a processor coupled to the RF transceiver, wherein the processor is configured to:

obtain status information related to the first V2X UE;

quantify mobility information included in the status information into a first severity level, mobility change information included in the status information into a second severity level, and internal status information about the first V2X UE included in the status information into a third severity level; and transmit a message based on the status information, wherein each of the first severity level, second severity level, and third severity level is applied with a weight determined based on station type information, wherein the processor is further configured to determine one transmission mode among a plurality of preconfigured transmission modes based on the first severity level, and wherein the message is transmitted based on transmission and reception intervals and transmission power set according to the one transmission mode.

* * * * *